(12) United States Patent
Attwater et al.

(10) Patent No.: US 7,970,615 B2
(45) Date of Patent: Jun. 28, 2011

(54) TURN-TAKING CONFIDENCE

(75) Inventors: David Attwater, Southport (GB); Bruce Balentine, Denton, TX (US)

(73) Assignee: Enterprise Integration Group, Inc., San Ramon, CA (US)

( * ) Notice: Subject to any disclaimer, the term of this patent is extended or adjusted under 35 U.S.C. 154(b) by 0 days.

(21) Appl. No.: 12/862,322

(22) Filed: Aug. 24, 2010

(65) Prior Publication Data

US 2010/0324896 A1 Dec. 23, 2010

Related U.S. Application Data

(63) Continuation of application No. 11/317,391, filed on Dec. 22, 2005, now Pat. No. 7,809,569.

(60) Provisional application No. 60/638,431, filed on Dec. 22, 2004.

(51) Int. Cl.
*G10L 15/18* (2006.01)

(52) U.S. Cl. ........ 704/257; 704/231; 704/251; 704/246; 704/270; 704/270.1

(58) Field of Classification Search .................. 704/257, 704/231, 251, 246, 270, 270.1
See application file for complete search history.

(56) References Cited

U.S. PATENT DOCUMENTS

| | | | |
|---|---|---|---|
| 4,570,217 A | 2/1986 | Allen et al. | |
| 5,276,765 A | 1/1994 | Freeman et al. | |
| 5,652,789 A | 7/1997 | Miner et al. | |
| 5,878,274 A | 3/1999 | Kono et al. | |
| 5,948,059 A | 9/1999 | Woo et al. | |
| 5,999,902 A | 12/1999 | Scahill et al. | |
| 6,006,175 A | 12/1999 | Holzrichter | |
| 6,058,166 A | 5/2000 | Osder et al. | |
| 6,094,476 A | 7/2000 | Hunt et al. | |
| 6,111,937 A | 8/2000 | Kuroiwa et al. | |
| 6,144,938 A | 11/2000 | Surace et al. | |
| 6,173,266 B1 | 1/2001 | Marx et al. | |
| 6,246,981 B1 | 6/2001 | Papineni et al. | |
| 6,260,015 B1 | 7/2001 | Wang et al. | |
| 6,296,570 B1 | 10/2001 | Miyamoto et al. | |
| 6,334,103 B1 | 12/2001 | Surace et al. | |
| 6,370,238 B1 | 4/2002 | Sansone et al. | |
| 6,421,672 B1 | 7/2002 | McAllister et al. | |
| 6,574,600 B1 | 6/2003 | Fishman et al. | |
| 6,697,460 B2 | 2/2004 | Knott et al. | |
| 6,760,050 B1 | 7/2004 | Nakagawa | |
| 6,845,356 B1 | 1/2005 | Epstein | |

(Continued)

OTHER PUBLICATIONS

Cisco Systems, Inc. et al., Speech Application Language Tags (SALT), Document, Jul. 15, 2002, 112 Pages, Cisco Systems, Inc. et al.

(Continued)

*Primary Examiner* — Qi Han
(74) *Attorney, Agent, or Firm* — Alston & Bird LLP

(57) ABSTRACT

A method for managing interactive dialog between a machine and a user. In one embodiment, an interaction between the machine and the user is managed by determining at least one likelihood value which is dependent upon a possible speech onset of the user. In another embodiment, the likelihood value can be dependent on a model of a desire of the user for specific items, a model of an attention of the user to specific items, or a model of turn-taking cues. The values can be used to determine a mode confidence value that is used by the system to determine the nature of prompts provided to the user.

12 Claims, 10 Drawing Sheets

U.S. PATENT DOCUMENTS

| | | | |
|---|---|---|---|
| 6,920,616 | B1 | 7/2005 | Abbott et al. |
| 7,028,269 | B1 | 4/2006 | Cohen-Solal et al. |
| 7,058,893 | B2 | 6/2006 | Abbott et al. |
| 7,058,894 | B2 | 6/2006 | Abbott et al. |
| 2001/0047263 | A1 | 11/2001 | Smith et al. |
| 2002/0049593 | A1 | 4/2002 | Shao |
| 2002/0091530 | A1 | 7/2002 | Panttaja |
| 2002/0098886 | A1 | 7/2002 | Nishizawa et al. |
| 2002/0133341 | A1 | 9/2002 | Gillick et al. |
| 2002/0147593 | A1 | 10/2002 | Lewis et al. |
| 2002/0198722 | A1 | 12/2002 | Yuschik |
| 2003/0016793 | A1 | 1/2003 | Balentine et al. |
| 2003/0083874 | A1 | 5/2003 | Crane et al. |
| 2003/0093274 | A1 | 5/2003 | Thompson |
| 2003/0130849 | A1 | 7/2003 | Durston et al. |
| 2003/0191648 | A1* | 10/2003 | Knott et al. .................. 704/275 |
| 2003/0206622 | A1 | 11/2003 | Foster |
| 2004/0037434 | A1 | 2/2004 | Balentine et al. |
| 2004/0078201 | A1 | 4/2004 | Porter et al. |
| 2004/0088167 | A1 | 5/2004 | Sartini |

OTHER PUBLICATIONS

W3C, Speech Recognition Grammar Specification, Mar. 16, 2004, Retrieved Dec. 28, 2005 from Internet Site http://www.w3.org/TR/2004/REC-speech-grammar-20040316/, 86 Pages, Version 1.0, W3C.

Spirit Corp, Voice Activity Detector (VAD) Algorithm User's Guide, Mar. 2003, User's Guide, 36 pages, Texas Instruments.

Emanuel A. Schegloff, Overlapping Talk and the Organization of Turn-Taking for Conversation, 2000, 63 pages, Cambridge University Press—Language in Society.

Strom et al., Intelligent Barge-In in Conversational Systems, Oct. 16, 2000, 4 pages, MIT Laboratory for Computer Science.

Balentine et al., Debouncing the Speech Button: A Sliding Capture Window Device for Synchronizing Turn-Taking, 1997, 27 pages, Kluwer Academic Publishers.

Tichelen, Semantic Interpretation for Speech Recognition, W3C Working Draft, Nov. 8, 2004, 46 pages, W3C.

Bruce Balentine et al., How to Build a Speech Recognition Application, Book, Apr. 1999, pp. 1-335, First Edition, Enterprise Integration Group, Inc., San Ramon, California, USA.

Bruce Balentine et al., How to Build a Speech Recognition Application, Book, Dec. 2001, pp. 1-413, Second Edition, Enterprise Integration Group, Inc., San Ramon, California, USA.

Marti A. Hearst, Mixed-Initiatice Interaction, Journal, Sep./Oct. 1999, pp. 14-23, IEEE Intelligent Systems.

Mark Nickson, Natural Language Meets IVR, Apr./May 1998, pp. 1-2 of Internet Site http://www.speechtechmag.com/issues/3_2/cover/433-1.html, Speech Technology Magazine.

Brenden Courtney Maher, Navigating a Spatialized Speech Environment Through Simultaneous Listening within a Hallway Metaphor, Thesis, Jan. 7, 1998, 81 Pages, Massachusetts Institute of Technology.

* cited by examiner

Speech Duration Confidence

State Completion Confidence

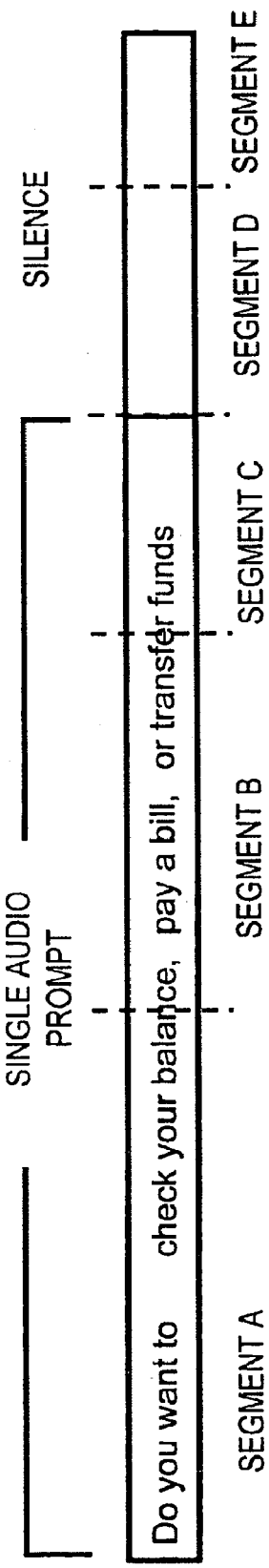
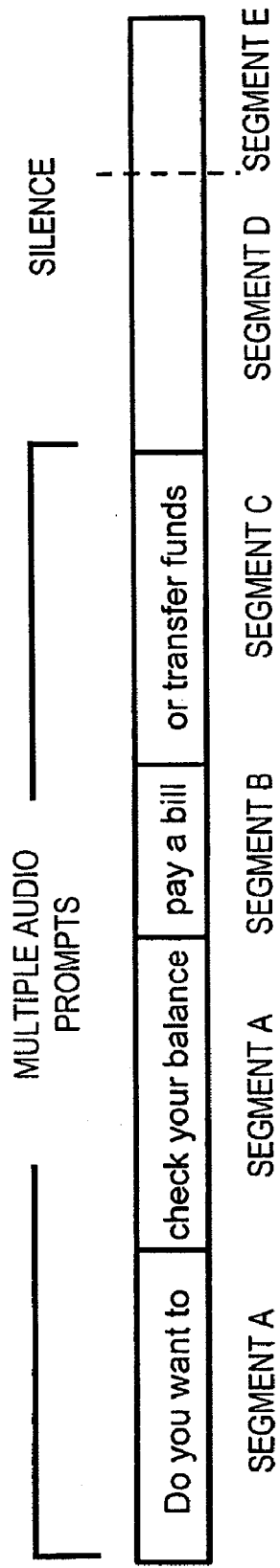
FIG. 3A
Audio Prompts May Consist of Logical Segments
FIG. 3B
Audio Prompts May Consist of Physical Segments FIG. 9   DTMF-Biased FIG. 10   Speech-Biased

TURN-TAKING CONFIDENCE

CROSS-REFERENCE TO RELATED APPLICATIONS

This application is a continuation of U.S. patent application Ser. No. 11/317,391, filed Dec. 22, 2005 now U.S. Pat. No. 7,809,569, which in turn claims priority from U.S. Provisional Patent Application 60/638,431, filed Dec. 22, 2004, both of which are hereby incorporated by reference.

TECHNICAL FIELD

This disclosure relates to a method for calculating "confidence" values, similar to the confidence currently reported by automatic speech recognition (ASR) technologies, to enhance speech recognition confidence with turn-taking timing information, and a model of human short-term memory for use in selecting prompts to provide to a caller.

BACKGROUND

Interactive Voice Response (IVR) applications use either DTMF or speech recognition. If DTMF, the application is invariably organized as a hierarchical collection of menus—each menu presenting a small collection of options from which the user may select. If using speech, the application might mimic DTMF menus or form-filling dialogues—an organizing architecture known as directed dialogue—or might adopt a newer and more sophisticated interface design paradigm known as natural language (NL).

One of the problems of ASR in supporting these dialogues is the difficulty of distinguishing between sentient user speech and distracting acoustical events—including intermittent noises, user mumbling, side conversation, user false starts, and similar occurrences. These events lead to instability in the dialogue, and error-recovery routines aimed at fixing the damage complicates the design and development of ASR applications.

SUMMARY

In one embodiment of the invention, a method manages an interactive voice response dialog between a machine comprising automatic speech recognition and a user, said method comprising the steps of setting a mode confidence level parameter value to a first value prior to a first input from said user wherein said first input is of a speech input mode, selecting one of a plurality of audio prompts comprising speech to annunciate to the user from the machine based on said first value of said mode confidence level parameter, wherein said one of said plurality of audio prompts solicits said first input comprising a first semantic response from said user in said speech input mode, annunciating the at least one of a plurality of audio prompts to said user, receiving said first input from said user, determining a first speech recognition confidence level based on said first input, setting said mode confidence level parameter to a second value based on said first speech recognition confidence level, said second value indicating a lower level of confidence of recognition relative to said first value of said mode confidence level, selecting an another one of at least one of a plurality of audio prompts based on said mode confidence level, and annunciating to the user from the machine said another one of least one of a plurality of audio prompts comprising speech based on said second value of said mode confidence level wherein said another one of said plurality of phrases solicits said first semantic response from said user in a DTMF input mode.

In another embodiment of the invention, a method for managing interactive voice response dialog between a machine comprises automatic speech recognition and a user, said method comprising the steps of setting a mode confidence level parameter at a first value prior to a first input from said user wherein said first input is of a DTMF input mode, selecting one of a plurality of audio prompts comprising speech to annunciate to the user from the machine based on said first value of said mode confidence level parameter, wherein said one of said plurality of audio prompts solicits said first input comprising a first semantic response from said user in said DTMF input mode, annunciating the at least one of a plurality of audio prompts to said user, receiving said first input from said user, determining a first speech recognition confidence level based on said first input, setting said mode confidence level parameter to a second value based on said first speech recognition confidence level, said second value indicating a higher level of confidence of recognition relative to said mode confidence level, selecting an another one of at least one of a plurality of audio prompts based on said mode confidence level, and annunciating to the user from the machine said another one of at least one of a plurality of audio prompts comprising speech based on said second value of said mode confidence level wherein said another one of said plurality of audio prompts solicits a different semantic response from said user in a speech input mode.

In yet another embodiment of the invention, A method for managing interactive voice response dialog between a machine comprising automatic speech recognition and a user, said method comprising the steps of setting a mode confidence level parameter at a first value prior to a first input from said user wherein said first input is of a speech input mode, selecting one of a plurality of audio prompts comprising a plurality of speech segments to annunciate to the user from the machine, wherein said one of said plurality of audio prompts solicits said first input comprising a first semantic response from said user in said speech input mode, annunciating the at least one of the plurality of speech segments to said user, receiving said first input from said user, wherein said first input comprises speech input mode, determining a first speech recognition confidence value based on said first input, determining an onset time of said speech relative to the at least one of the plurality of speech segment for determining a turn confidence value, determining a speech duration of said first input, said speech duration used for determining a speech duration confidence value, using said first speech recognition confidence value, said turn confidence value, said speech duration confidence value for setting said mode confidence level parameter at a second value, selecting another one of at least another one of a plurality of audio prompts based on said mode confidence level parameter, and annunciating to the user from the machine another one of said plurality of audio prompts wherein said another one of said plurality of audio prompts solicits said first semantic response from said user in a DTMF input mode.

This summary details only three of the embodiments of the invention, and should not be otherwise used to limit the scope of the claims herein.

BRIEF DESCRIPTION OF THE DRAWINGS

For a more complete understanding of the present invention and the advantages thereof, reference is now made to the following Detailed Description taken in conjunction with the accompanying drawings, in which:

FIGS. 3A-3B shows two methods of segmenting prompts into turn taking zones;

DETAILED DESCRIPTION

Figure 1:
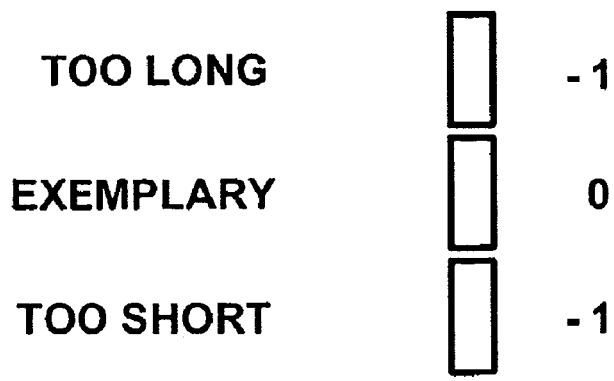
FIG. 1 shows three quantized levels of speech-duration confidence.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, and the like, have been omitted inasmuch as such details are not considered necessary to obtain a complete understanding of the present invention, and are considered to be within the understanding of persons of ordinary skill in the relevant art.

Multi-Dimensional Confidence

ASR technologies today return values—known as "confidence"—that aim to distinguish between acoustic/phonetic classes that are similar to the talker's unknown speech (the speech which the ASR is expected to recognize) and unrelated acoustical events that are less similar. These values assist in preventing false acceptance of out-of-grammar (OOG) speech, and in triggering dialogues to recover so-called inter-word rejections (wherein two similar classes are recognized and the system must distinguish between them).

Extracting Non-Acoustic/Phonetic Confidence

The method described here proposes to extract similar kinds of value for various other dimensions not directly related to the acoustic/phonetic patterns of speech. The dimensions include time—both the turn-taking information contained in the onset of user speech, as well as the duration of speech—and exit conditions associated with interactions during the course of the session. By letting these multi-dimensional confidence values influence one another, this method can reduce application complexity while stabilizing the IVR dialogue. Non-acoustic/phonetic confidence may include but is not limited to the following dimensions:

Speech duration confidence;
State-completion confidence;
Turn-taking confidence; and
Mode confidence (e.g. touch-tone and speech).

Speech Duration Confidence

Human speech conforms to certain ranges of duration. Automatic Speech Recognition (ASR) technologies use voice activity detection (VAD) or endpointing algorithms to detect the onset and offset of user speech. These algorithms often include controlling parameters to assist in distinguishing between human speech and other sounds that might otherwise be incorrectly classified as user speech. Such parameters which relate directly to durational aspects might include those shown in the Table 1 below:

TABLE 1

| Parameter | Description | Typical |
|---|---|---|
| Minimum voiced duration | High energy input must last for at least the duration specified by this parameter before speech is deemed to have started. Shorter-duration sounds are presumed to be transient noises. | 60-80 ms |
| babble | Humans can only speak for so long before having to take a breath. Sounds that last longer than this presumed to be side conversation or extended background noise. | 2-3 seconds |
| Embedded silence duration. | Human speech includes stop consonants and other moments of silence or low-energy sound. It is important to distinguish such embedded silences from the final offset of speech. A silence duration must meet this value before speech is deemed to have ended | 300 ms |
| beginning and ending bias | Human speech often begins with low-energy consonants such as fricatives. VAD algorithms usually detect the onset and offset of energetic vowels, and not these lower level consonants. This "fudge factor" parameter moves the voice duration markers outward to encompass possible low-energy human speech in the endpointing decision. | 100-150 ms |

These parameters are aimed at preventing false triggering or inappropriate time alignment caused by the misclassification of background noise as human speech. Such misclassifications lead to speech recognition errors and subsequently complicate ASR dialogue design. Because VAD and endpointing algorithms often rely solely on raw energy, however, misclassification is a common occurrence—especially when users are speaking from environments dominated by intermittent noise (e.g., public places).

Misaligned speech—that is, speech plus noise that has been incorrectly endpointed by the VAD or endpointing algorithm—often exhibits subsequently low recognition confidence. But the ASR alone is not always able to detect and reject such misalignments. The same is true when the user has not spoken at all, and the ASR has incorrectly accepted noise as speech.

After the ASR has returned a result, the dialogue logic itself has the ability to compare the total duration of the incoming speech against pre-defined ranges. The total duration can be discovered in two ways:

The ASR reports onset and offset information directly to the application; or,

The application uses a combination of time stamps and speech onset information to calculate the probable duration of the input.

The pre-defined ranges can also be specified in one of three ways:

Hand-specified fixed parameters;
Calculated automatically from grammars or audio files; or
Learned over time from incoming user data.

In all cases, word durations are highly variant and precise values are rarely helpful. So the goal of a speech duration confidence value is to assist slightly in nudging overall recognition confidence in one direction or the other—to lend additional credence to the final ASR result.

In one embodiment of the present invention, there are three quantized levels of confidence as shown in FIG. 1. These pre-defined ranges are defined by two parameters—MinTypicalDuration and MaxTypicalDuration. If the duration of the input is below MinTypicalDuration i.e., quite short—longer than the minimum voiced duration parameter but still short compared to the expected input—then it is assigned to the too-short category and can be assigned a speech duration confidence of −1. If the duration is above MaxTypicalDuration—i.e., quite long—approaching the babble timeout parameter—then it is assigned to the too-long category and can be also assigned a value of −1. Speech durations that fall within the expected range are assigned to the 'exemplary' category and can be assigned a value of O. Boundary durations thus have a negative effect on the overall confidence value.

As a result of this dimension, ASR confidence must be higher for extremely short and extremely long speech than it must be for mid-duration utterances. The effect is to compensate for intermittent background noises that extend either the beginnings or the ends of words.

State Completion Confidence

Users that become confused often exhibit predictable behaviors, either not speaking at all, speaking after long delays, or producing OOG of various kinds These conditions often amplify errors, particularly state errors in which the user is in the incorrect state (and therefore talking to an incorrect or unknown grammar). Such behaviors often turn up as timing patterns in the ASR input.

Conversely, users that are successfully conversing with a machine tend to establish predictable timing patterns by replying to questions, wielding control words, and stepping the dialogue reliably forward. The state completion confidence value is designed to exploit this predictable user behavior.

Figure 2:
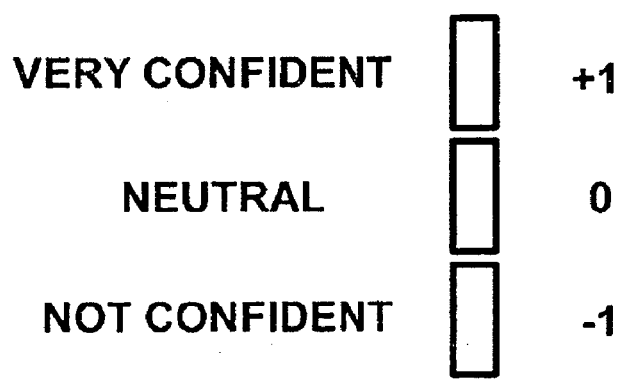
FIG. 2 shows three quantized levels of state-completion confidence.

As shown in FIG. 2, users who enter a given state, listen to a prompt, and give a sentient reply within a specific amount of time are considered "exemplary." These conditions lead to a high state-completion confidence. Users who experience error-recovery dialogues or spend a longer amount of time in the state due to pauses, false starts, or other behaviors indicative of confusion lead to a lower state-completion confidence.

There are three levels. States that take too long to complete can be assigned a confidence of −1. States that experienced no error-recovery and yet still occupied too much or too little time can be considered neutral and are assigned a value of zero. States that completed according to an exemplary interaction can be assigned a value of +1.

Turn Confidence

Turn Confidence is an example of one of the measures applicable to the multi-dimensional confidence measure hereinbefore described, a method to enhance speech recognition confidence with turn-taking timing information, and a model of human short-term memory.

Using Audio Prompt Segments to Estimate Turn-Taking Likelihood

One method of enhancing speech recognition with turn confidence is to organize each audio prompt into regions during which user interruption is more or less appropriate. This is done by dividing the prompt itself into segments. The segments may be specified as an offset from the beginning of the prompt—either in number of samples, or in time units. There are other ways to specify these segments, to be discussed later.

Logical Segments

An audio prompt is a recorded or synthesized sound that is designed to evoke a response from the user. Prompts may be long or short. During the playback of the prompt, interruption from the user—via DTMF or speech—may occur at any time. The location within the prompt that is the point of interruption provides information about turn taking—information that can be used to construct a "turn-taking confidence" value.

As shown in FIG. 3A, a single audio prompt may be subdivided logically into segments. Each segment is based on the information contained in the segment, and the degree to which that information represents an appropriate cue that is likely to cause the user to take a turn. As shown in the figure, segments may incorporate the following information.

1. Segment A.

This is the very beginning of the prompt, and incorporates introductory information or silence. This first segment may consist of phrases such as:

Would you like . . .

Thank you for . . .

Please say . . .

The segment has not conveyed adequate information to lead logically to a user response. What this means is that users who interrupt the prompt during this segment can be presumed to be "expert"—that is, users who, through prior interaction with the application, can predict the prompt and its expected response. Such users should be expected to present speech that is recognized with high confidence. On the other hand, it often happens that one or more noises from the user (throat clearing or disfluencies) or from the background cause false prompt cutoff. In addition, users often start speaking with the goal of cutting off the prompt, and then stop and restart—under the assumption that the system "didn't hear" the beginning of speech. Such false starts—sometimes called "stutters"—lead to recognition errors. All of these events can be expected to generate low-confidence recognition results. If speech begins at segment A or is already underway when the prompt begins, then turn-taking confidence is low. This means that speech recognition confidence must be very high if it is to compensate for the aggressive timing of the interruption.

2. Segment B.

This component of the prompt can be the region during which meaningful information is first conveyed to the user. Different users respond at different rates to this information, so interruption at this location may represent a quick user responding to the prompt, or may indicate noises or false starts as in segment A. If speech starts here, then turn-taking confidence is neutral (neither high nor low). Turn-taking confidence therefore does not influence speech recognition confidence.

3. Segment C.

This can be the final ending syllable(s) of the prompt—turn-taking cues built into the prompt have been delivered. Many users interrupt at this point, "dovetailing" their speech with the tail of the prompt. This ending segment therefore represents an ideal moment for the user to begin speaking If speech begins here, then turn-taking confidence is high.

4. Segment D.

This can be the silence, managed by the turn-taking model of the system, which follows the final syllables of the prompt. For a period, defined by a timeout parameter, this also represents the ideal moment for the user to begin speaking. If speech begins here, then turn-taking confidence is high.

5. Segment E.

As silence continues, the confidence in turn-taking begins to drop.

Physical Segments

An alternate method for segmenting a prompt to support turn-taking confidence is to use independent audio recordings, as shown in FIG. 3B. The method described below for extracting turn-taking confidence applies to either logical or physical methods for segmenting the prompt into turn-taking regions.

1. Segment A may consist of one or more short audio recordings that contain introductory information.

2. Segment B carries the same turn-taking implications shown in FIG. 3A. Segment B may also consist of multiple recordings.

3. Segment C is likely to be a single recording, but need not be.

4. Silence segments D and E are as shown in FIG. 3A.

Turn-Taking Confidence

Figure 4:
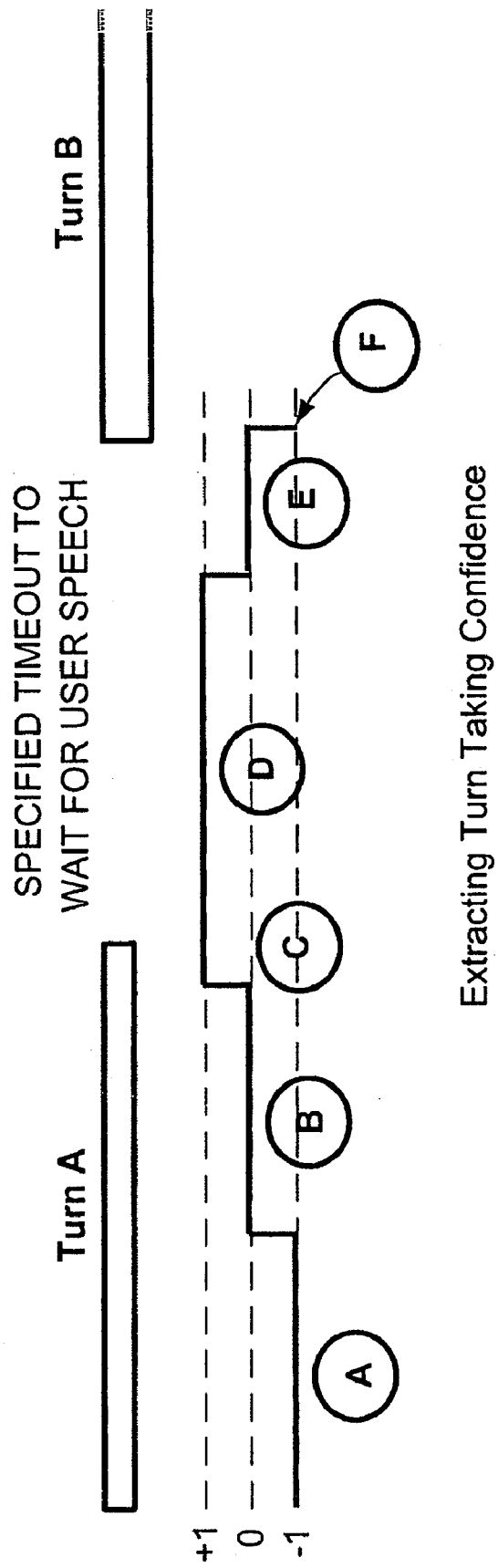
FIG. 4 shows turn-confidence varying according to turn-taking zones.

Given the above segmentation of the prompt, the method for extracting a turn-taking confidence value can be understood. As shown in FIG. 4, a quantized numeric value can be assigned to reflect the likelihood of speech onset at a given point in the prompt.

There are many ways to assign a numeric value to the segment. For the sake of simplicity, this discussion suggests a three-level value:

A. If the user begins speaking during the first segment, the turn-taking confidence receives a value of −1, representing low confidence.

B. If the user begins speaking during the second segment, the turn-taking confidence receives a value of zero—representing medium confidence.

C. If the user begins speaking during the third segment the turn-taking confidence receives a value of +1, representing high confidence.

D. If the user begins speaking during the following silence the turn-taking confidence receives a value of +1, representing high confidence.

E. If the user begins speaking late within the silence window, the turn-taking confidence receives a value of zero—representing a medium confidence.

F. If no speech appears (for example a recognizer silence timeout is reached), the turn-taking confidence receives a value of −1, representing low confidence.

Note that condition F could be extended to include a short period at the start of the next turn if it is technologically possible to do this. Interruptions at the start of the next turn can be given a confidence value of −1. This should lead to responses to the previous questions which are out of the grammar for Turn B being rejected. Rejection of an utterance which starts in this portion should be deemed to be an answer to the previous question and it would be sensible to return to that dialogue state under this condition.

Note that the 3-levels of confidence are shown here to make the discussion easy to understand. The method might allow many levels, using both positive and negative integers, might be based on a wide range of numbers with parameterized thresholds, or could use floating point numbers for higher precision.

One such modification would be to cast the three level turn confidence model into a likelihood with three values between 0 and 1 being mapped to the three confidence levels. The following table, Table 2 defines parameters which relate the turn taking confidence levels to probability-like values between 0 and 1. These values enable this simple model of turn taking onset likelihood to be used in conjunction with further modifications described below in Table 2.

TABLE 2

| Level | Name | Likelihood Value |
|---|---|---|
| +1 | MaxOnset | 1.0 Question |
|  |  | 0.5 Example |
| 0 | YieldAnticipationThreshold | 0.5 |
| −1 | MinOnset | 0.1 |

Generating a Continuous Measure of Turn Confidence

In an alternative embodiment, the turn confidence is computed directly from the sample offset of the prompt. That is, a continuous function could be used to calculate the turn confidence. This continuous value is based on the sample position of anticipated speech onset relative to the total number of samples in the prompt.

In this alternative embodiment a more detailed model of the utterance is defined where a turn may contain multiple potential turn boundaries contributing to the overall likelihood of a turn-taking act.

Machine Turns and Moves

A turn is the period from which a machine starts speaking through to where it decides that a significant user-event occurred which needs application logic to respond to it—i.e., a change in dialogue state. It is thus an autonomic state machine responding primarily to local information managing the basic sharing of the speech channel between two interlocutors—in this case the machine and the user.

If the user remains silent, a machine turn can be formulated in advance to be a sequence of spoken phrases (or moves) which will be spoken by the machine in sequential order until it requires a response in order to move forwards. An example turn would be:

Do you want to check-a-balance, pay-a-bill, or transfer funds?

This could be considered to be made up of three moves:

[Do you want to check-a-balance] [pay-a-bill] [or transfer funds?]

The selection of what constitutes a move is not mandated by this design. It is however anticipated that generally:

a) each move will be a phrase in its own right;

b) each move will have a pause before and after it (pauses may be very short); and c) the prosody of the recorded audio will be indicative of move boundaries.

It is further assumed that the point of interruption of a move by a speaker is important.

This design recognizes that among other things, most move boundaries will act as a turn-taking cue, and that move boundaries will generally coincide with phrasal boundaries. The design can take as its input a sequence of moves which may be anticipated in the absence of any user response, each potentially with its own anticipated grammar, and a specified pause following each move.

The Recognition Model

The user may of course also be making turns and moves in a similar fashion to the machine. With current technology the machine unfortunately has access to much less information regarding the user turn.

This design can use the SALT model. This is an event based model where listen and prompt are independent threads, giving the designer the widest range of options yet for building turn-taking models. Other similar models could be used. It is anticipated that speech technology vendors will also develop better ways of detecting user phrase boundaries, disfluent re-starts, and yielding behavior.

The behavior of the machine on detection of speech or some other noise is not the subject of this design. One such behavioral design, which describes a complete turn-taking model, is described in commonly assigned, co-pending U.S. patent application Ser. No. 11/317,424, entitled "Turn Taking Model." This design is complementary to that model, but does not require it in order to operate.

Grammars and Semantic Items

The design assumes the presence of a basic grammar or language model which describes the possible sequence of words which the user may speak at this current point. This grammar will anticipate all of the utterances which are expected during any particular recognition period. This design does not demand that the speech recognition grammar remains static during a whole turn, but anticipates that with current technology this is the most likely scenario. It is also further assumed that in some manner the grammar associates certain sequences to particular semantic items. These items represent the meaning of that particular user utterance. For the purposes of this description, a semantic item may represent a set of related meanings (e.g., the set of all towns), or a single specific meaning (e.g. the town 'Southport'). For the sake of clarity let us assume that the grammar and its corresponding semantic item relationships are described by a standard W3C grammar, and that the semantic information is represented by a grammar tag. This is an industry standard approach. We also define a special semantic item, Out-Of-Grammar (OOG). This semantic item represents the hypothesis from the recognizer that the user spoke a phrase which is outside of the defined grammar. This is an important addition, as the presentation of out-of-grammar utterances is potentially as predictable with respect to the time of presentation as in-grammar utterances, and may also carry specific meaning for the dialogue.

One such example of predictable onset timing for out-of-grammar is in list browsing. While presenting lists to users they often indicate the desired list item by using an utterance such as 'that one'. These utterances do not always have predictable wording. Instead the designer may choose to leave these words out of the grammar and rely on accurate out-of-grammar detection to infer, given the point of the interruption, that the user 'pointed' at a specific word or phrase. More than one special out-of-grammar semantic token can be defined by the designer. Each of these will be associated with a different semantic meaning (e.g., the word that it is pointing to). Within the W3C grammar model we can further define a semantic item now as an XPath identifying a specific node (class) or text value branch (item) of an XML tree expressed using the W3C semantic interpretation format. It should be noted however that this is only an example of how a grammar may be described and associated with semantic information. There are many other ways to effect such a relation which are well known to those skilled in the art. An alternative, for example, would be the use of statistical language models and semantic classifiers.

Time-Dependence in Turn Taking.

The timing of a response from a user is dependent on the following things:
  what the user wants (desire);
  the user's current focus of attention (attention):
    where the key stimuli occur in the prompts; and
    short-term memory limitations; and
  the turn-taking cues in the prompt (onset).
All of these aspects of timing are modeled and exploited by this design. The result is a series of functions which model the likelihood of a turn being taken at a particular point in time.

A Note on Probability Density Functions

The model described in this design uses the concept of functions, dependent on the time of the onset of user speech, which return probabilities. Within the framework of the math presented in this design, these functions formally generate probability density functions (PDF's) over the discrete (or continuous) variable t (time). The integration of the area under the PDF should sum to 1.0 for a true PDF. Estimates of probabilities from PDF's also require integration over a certain time period. The wider the time sample period, the greater the probability of the event. For pragmatic reasons the functions described below will generally be used for comparative purposes only. Thus the functions described below are pseudo PDFs which generally return a value from 0.0 to 1.0.

Desire Likelihood

The first step is to estimate the probability that a caller interrupting at time t will desire semantic item N. This is represented by a function returning a PDF for each semantic item as follows:

$$P(D_n)=\text{DesireLikelihood}(N,t) \qquad \text{Equation 1}$$

Where DN represents the event that the user desires semantic item N. The current design assumes that user desire does not vary with time over a single turn. This is not an essential assumption, but if we use it then:

$$P(D_n)=\text{DesireLikelihood}(N)=K_n \qquad \text{Equation 2}$$

This is just a vector of the prior probabilities for each semantic item. Where prior values are not known, all of these numbers are set to a single constant, e.g., 1.00.

Attention Likelihood

This design assumes that, in general, the users are not likely to respond to a prompt until they have started to hear the key information in the prompt—i.e., as it encourages the user to formulate responses in their mind. By key information we mean the part of the move which is essential to the process of eliciting a specific response from the user. Take the earlier example:

[Do you want to check-a-balance] [pay-a-bill] [or transfer funds?]

There is one single initial move 'Do you want to check-a-balance'. The fragment 'Do you want to' indicates that a response is required, but until the fragment 'check-a-balance' is heard by the caller no specific response may be formulated. 'checka-balance' is therefore the key information in this phrase.

Users tend to wait for turn-taking boundaries. They also may choose to wait and continue to listen to additional information before deciding on a course of action. The design further assumes that additional key information which the user hears following this will interfere with the short-term memory of the caller. The attention contour function is used in this design to model this behavior. Each semantic item will have an attention contour across the whole turn. Each attention contour is a function of the timing of the constituent moves of the turn, and related parameters. The attention contour could be thought of as modeling the probability that, given a user desires a certain semantic item—that they will have this item in conscious attention at a particular point in time. It is thus a time-dependent function (see equation 3). This function should not be confused with the prior likelihood of the user desiring such an item (see above).

$$P(F_n/D_N)=\text{AttentionLikelihood}(N,t) \qquad \text{Equation 3}$$

Figure 5:
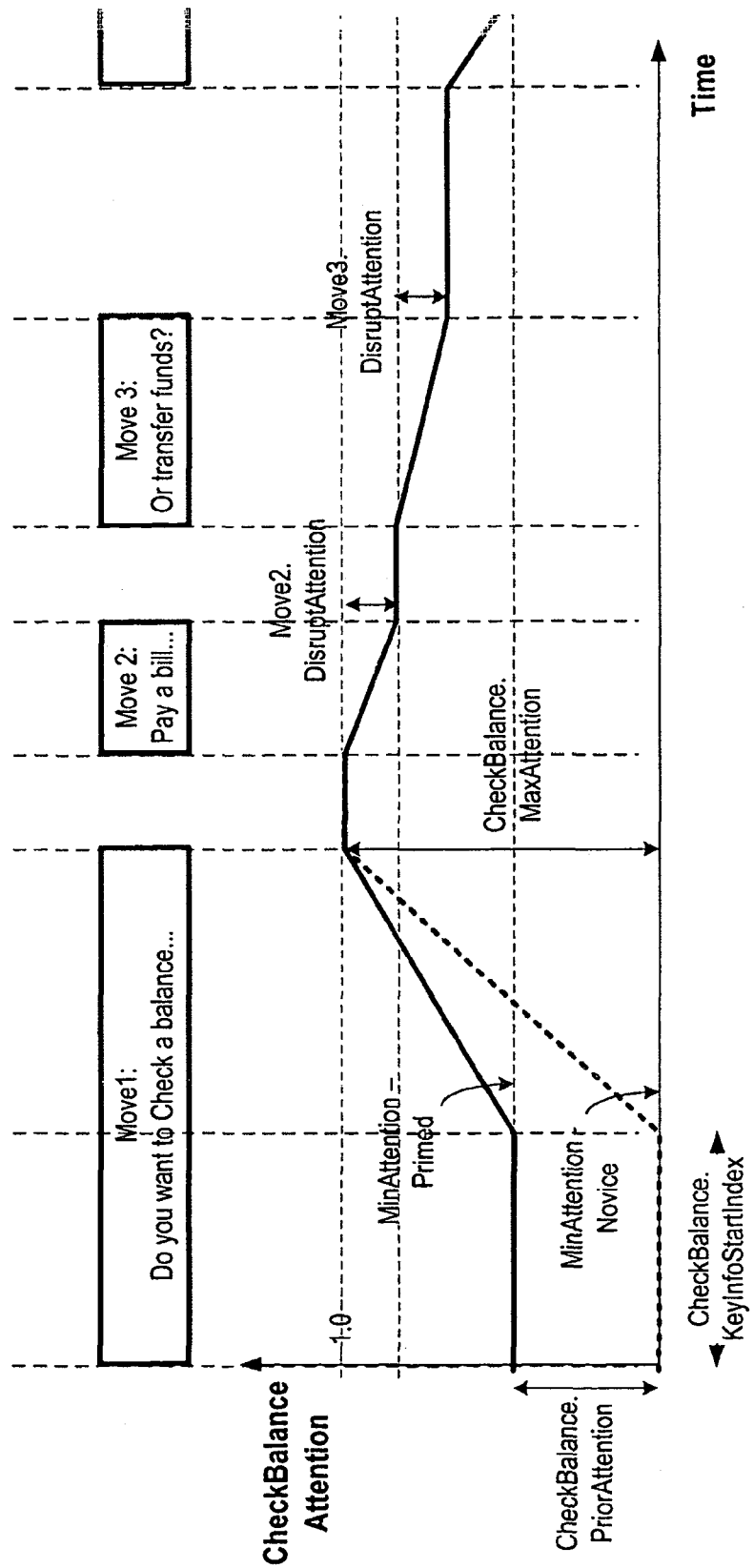
FIG. 5 shows a method of estimating attention contours.

A method to estimate the Attention Likelihood function is shown in FIG. 5. Each move in the dialogue is linked to a set of semantic items (F.1.F,,,,,). The moves draw attention to or 'activate' a potential response. Multiple moves may activate a semantic item, and multiple semantic items may be activated by a single move.

For a given turn, each Semantic Item has two parameters associated with it as shown in Table 3.

TABLE 3

| Parameter | Description | Default |
|---|---|---|
| MinAttention | The minimum attention likelihood present at all points of the turn. | 0.0 (Novice) 0.5 (Primed) |
| Max Attention | The maximum attention likelihood achieved by the move. | 1.0 |

The MinAttention parameter defines the degree to which the user is expected to already be primed to respond in this dialogue state. This priming is by definition external to the current dialogue move—although it may have occurred on previous user visits to this state. For example, the value may vary by user, and even dynamically throughout a dialogue, if a dynamic user-model of learning is used. The MaxAttention parameter defines the maximum degree to which the semantic item can be in the callers' attention. It is generally set to 1.0, but could be set to a lower value if it is likely that this item is mentioned only in passing—for example as a global dialogue command word such as 'help'.

For each activation which references the semantic item, the contribution of this activation to the semantic item attention likelihood rises linearly from the minimum to maximum value from the start of the Key Information in the activating move (see below) to the end of the move. Prior to the activating move, the contribution is equal to the MinAttention value reaching back until the start of the turn. We use 'Contribution' to reflect the fact that it is possible to have activations of the same semantic item on different moves in the turn. In such a case, the maximum contribution from one of these activations at any given time is taken to be the value. The value of the attention likelihood for a given semantic item never falls below the MinAttention value during the duration of the turn. MinAttention may therefore be thought of as an extra activation which is present throughout the whole turn.

Other models of this function are possible. Non-linear models such as exponential rises for the transition from Minimum to Maximum value are possible alternatives, for example. In the example shown in the figure, the first move 'Do you want to check a balance' is linked with (i.e., activates) the semantic item 'CheckBalance'. This semantic item is in turn linked to a grammar fragment (or fragments) generating the set of words or phrases which the caller may say when they wish to 'check a balance'. The W3C grammar and semantic interpretation standard are one such way to achieve this linkage.

In some embodiments, the key information in a prompt does not have to start at the beginning of the move, although this is the default setting. It does however make the assumption that the end point of the key information is co-incident with the end of the move. This is because the end of key information tends to contain turn-taking cues, and it is good design practice to locate it at the end of a phrasal unit (i.e., at the end of the move, but not necessarily the end of the turn).

The KeyInfoStartIndex parameter is provided to model delayed onset of key-information in the move. A final feature of the model is the decay of the attention function due to disruption of attention and short-term memory by subsequent speech. The value reaches MaxAttention at the end of the move, and then remains constant from this point onwards until the start of a subsequent move. The underlying assumption is that user attention is not affected by the silence in the pause following the move (recall that this pause may be long or short depending on the type of move and dialogue design decisions).

Each move has two parameters associated with it, as shown in Table 4.

TABLE 4

| Parameter | Description | Default |
|---|---|---|
| DisruptAttention | The amount by which all attention functions decay during this current move. | 0.2 |
| KeyInfoStartIndex | The time from the start of the current move where the key information begins. | 0.0 |

When the next move starts, the attention contour of all semantic items can be decreased by the amount specified by this parameter. Note this happens at move start, and is not delayed by a non zero value of KeyInfoStartIndex. The decrease is linear and spans the duration of the move. The decrease stops once the value of MinAttention for that semantic item has been reached.

This decrement simulates attention and short-term memory disruption as new items are introduced. The default value of 0.2 can be chosen for a specific reason—it represents a maximum short-term memory of five items (1/5) a conservative interpretation of the human short-term memory capacity of 7+/−2 items. Similarly, the MinAttention parameter thus represents the degree to which any long-term memory learning effects are present, that is: prior priming.

Note that with a value of 0.2, MaxAttention of 1.0 and MinAttention of 0.0 this model will reach zero probability after 5 moves. This will set the maximum limit of a list, for example, to five items before earlier items fall fully from conscious attention. Also note that the decrement emulates the recency effect, where items mentioned more recently hold the attention of the user. Note that the figure does not show the 'primacy' effect, wherein items mentioned first hold more sway. The omission is simply for clarity. Those skilled in the art will see that this effect—related to the user's internal mental rehearsal—can raise the contour predictably from move 2 and through move 3 and is easily added to the model.

Unlike the onset likelihood (see later), it is less desirable to continue the effect of this function through the following turn. The following turn may represent a change of dialogue state. Perception of this change by the user will likely divert their attention to a new topic. If there is no change in topic, then the designer is likely to set up similar onset likelihoods again in this following move. Having said that, a valuable addition to this model may be to raise the MinAttention value of a semantic item from "novice" to the "primed" level in subsequent similar moves. Such an action is appropriate once learning is deemed to have taken place, for example following the first or second visit to the same dialogue state (turn) in the same call, or following the user choosing this semantic item once or twice in the same call.

Onset Likelihood

Figure 6:
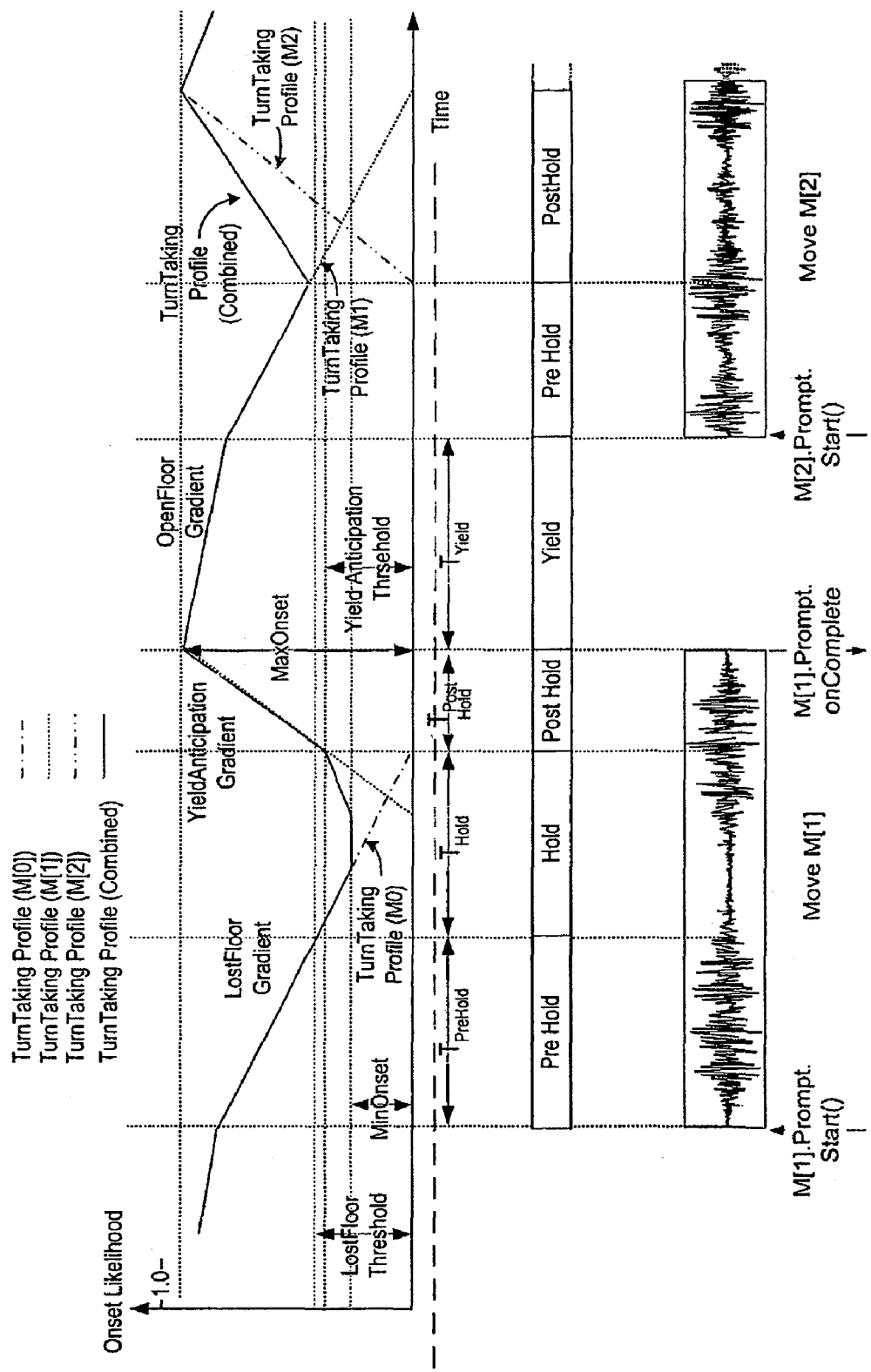
FIG. 6 shows a method of estimating onset contours.

The onset likelihood estimates to what extent speech onset will occur at a particular time. This function may be thought of as the likelihood that the caller will start speaking at a given moment, given a caller desires and has semantic item N in their attention at the moment. This can be expressed as shown in equation 4:

$$P(T_{onset}/F_n \cdot D_N) = \text{OnsetLikelihood}(N, t) \quad \text{Equation 4}$$

Where $T_{onset}$ is the speech onset event, and $F_N$ is the event representing the fact that the user has spoken a phrase related to semantic item N. In this design, an approximation to this function is made that the distribution is independent of N. That is to say that the probability of speech onset is only a function of the turn-taking cues in the turn. This assumption is a relatively safe one. Recall that attention and desire are modeled separately, and that the attention model for a particular semantic item makes it much less likely until it has been activated (i.e., until the machine move has mentioned it in some way). What this assumption says is that 'to the degree to which a user is attending to the need to present a particular semantic item at any given point—their choice of exactly when to present it will depend only on the turn-taking cues in the machines output. FIG. 6 shows one method to estimate this function. A scale of between 0 and 1 is shown with a linear axis. This means that it is not a true probability density function, but the scale is chosen for convenience. The choice of a value of 1.0 for MaxLikelihood means that for those who at the point where the floor is given away, the recognition confidence is not modified at all. Other values are dependent on the choice of this arbitrary scale.

The model takes the following parameters, one set of which are associated with each machine move as shown in Table 5.

TABLE 5

| Parameter | Description | Default |
| --- | --- | --- |
| YieldAnticipationGradient | The rate at which the onset function grows towards the MaxOnset point where the machine gives away the floor. Lower values denote longer overlap periods. | +0.8 per second |
| MaxOnset | The value of the onset function at the point where the machine chooses to give the floor away (i.e. the end of the move). Higher values denote stronger turn-taking cues. | 1.0 Question<br>0.5 Example<br>0.0 Continuing intonation |
| Open Floor Gradient | The rate at which the function decays from the MaxLikelihood when the machine gives the floor away. Higher values denote longer thinking periods prior to answer. | −0.05 per second |
| Lost Floor Gradient | The rate at which the function decays following the start of the next machine move. Note that this gradient extends into the region of the next move, and its contribution may overlap that of the YieldAnticipationGradient of the next move. Higher values indicate more rapid yield by the user to the new move | −0.4 per second |
| MinOnset | The minimum value of the onset function for the duration of this move and its following silence. Higher values of this indicate that the user is not co-operating with the turn taking model (e.g. using the barge-in user-interface method). | 0.1 |

These parameters are associated with each machine move, and the function represents a summation of its constituent moves which extend backwards and forwards from the MaxLikelihood point at the end of each machine move. This means that the LostFloorGradient and YieldAnticipationGradient parameters may overlap in their contribution to the function. Wherever this happens their contribution is simply summed.

Note also that these regions may overlap with previous or successive turns as well as at the move boundaries. Their contribution should extend in a similar manner. However it is recognized that with current technology this may not be achievable. In such cases the boundary between turns should be selected in such a manner as to minimize the impact of this discrepancy.

Note that there are many ways to approximate the turn-taking likelihood score other than the one described. For example the functions could be conceived as the sum of a number of Gaussian distributions centered at different time intervals with different amplitudes and standard deviations. Such a method would lend itself to a markov model or other process. Those skilled in the art will be aware of many alternative methods of training such models using training data—for example observations of actual turn-taking behavior in human-human or man-machine dialogs.

There are other features shown in FIG. 6 which are not used in the estimation of the likelihood contours. The reason for their inclusion is that this design may be used as a mechanism for estimating turn-taking floor holding states used by the turn-taking design such as described in the U.S. patent application Ser. No. 11/317,424 entitled "Turn Taking Model" by Attwater et al., filed on Dec. 22, 2005.

Figure 11:
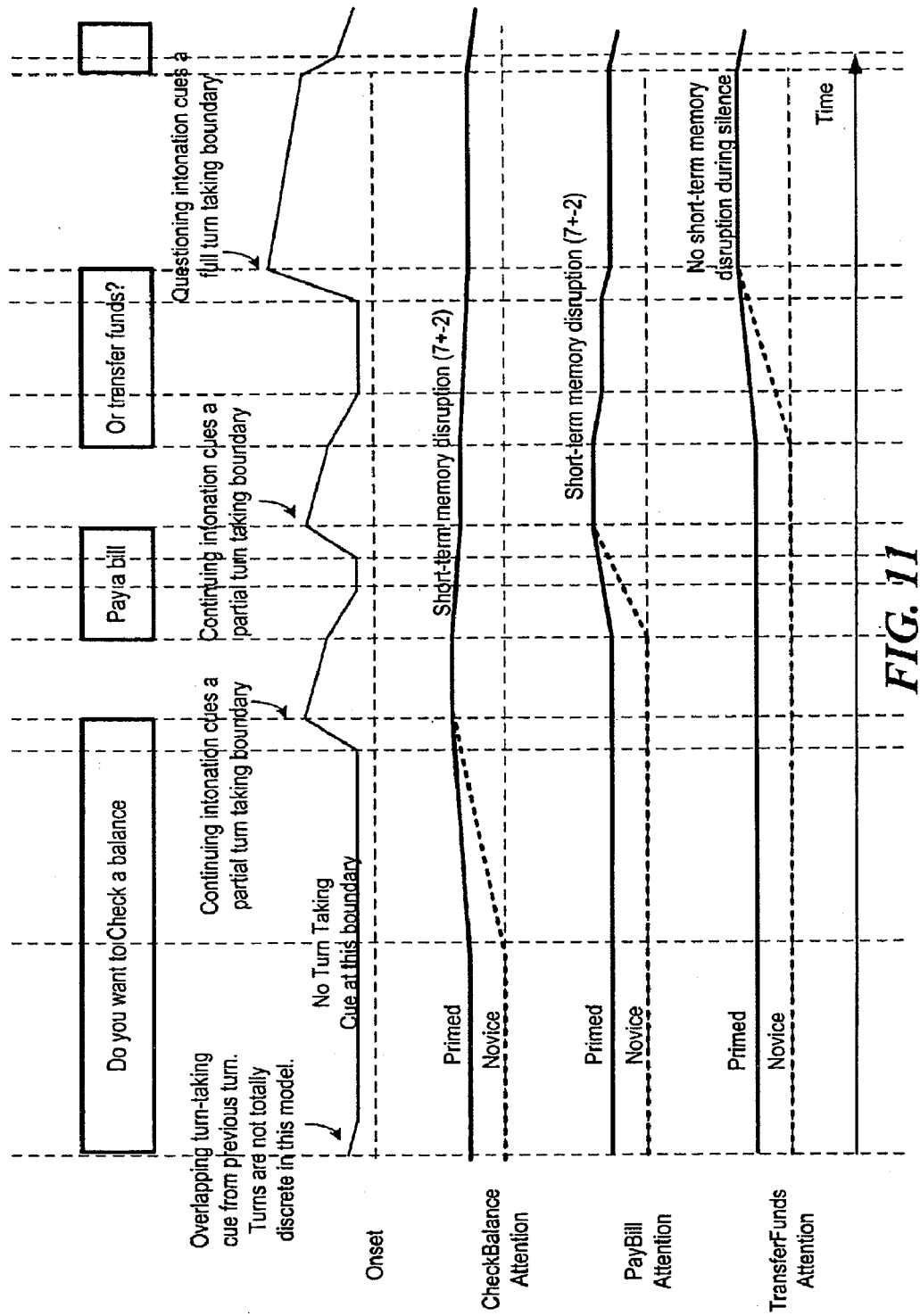
FIG. 11 shows an example onset contour, and also three attention contours.

FIG. 11 shows an example of the evolution of an onset likelihood and a number of associated attention likelihood functions as they vary whilst a prompt is being played out.

Using the Likelihood Distributions

Having defined these functions, let us turn our attention to how they may be used to effect more stable dialogue systems.

Compound Likelihood Functions

Figure 7:
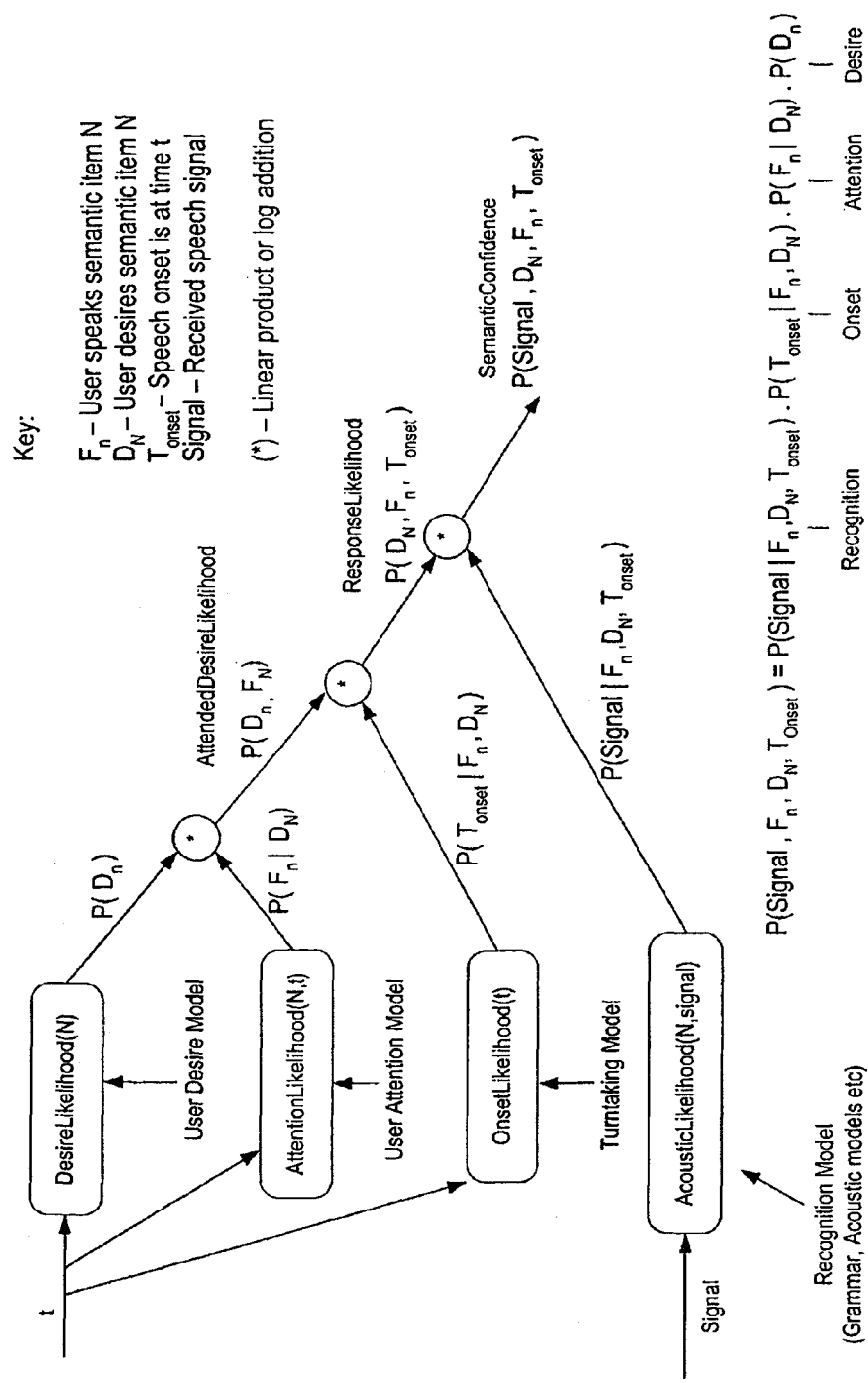
FIG. 7 shows a method of combining the onset, and attention contours to estimate confidence values.

The functions described in this design could be used for several different purposes. They could be used either directly or in combination. FIG. 7 shows some possible ways to combine the functions into higher level likelihood functions. These higher level likelihood functions are shown in Table 6:

TABLE 6

| Definition | Function Name | Description |
|---|---|---|
| $P(D_n, F_N)$ | AttendedDesireLikelihood | The likelihood that the user wants semantic item N, and has this item in their attention at time t. |
| $P(D_N, F_n, T_{onset})$ | ResponseLikelihood | The likelihood that the user will actually start to say semantic item N at time t. |
| $P(Signal, D_N, F_n, T_{onset})$ | SemanticConfidence | The likelihood that the user actually said item N starting at time t. |

Decision on Floor Holding Zones of a Move

The onset likelihood estimation could be used within the design described in the U.S. patent application Ser. No. 11/317,424, entitled "Turn Taking Model" by Attwater et al., filed on Dec. 22, 2005. In this case it would be used as a mechanism to derive the boundaries between the different floor holding states used in that design.

Consider FIG. 6 again. With the application of two more parameters shown below, the Pre-Hold, Hold, and Post-Hold regions described in the turn-taking state machine design may be derived. The parameters are shown in Table 7:

TABLE 7

| Parameter | Description | Default |
|---|---|---|
| LostFloorThreshold | The threshold below which the machine turn moves from the Pre-Hold state to the Hold state as the floor is taken away from the user by the machine. | 0.5 |
| YieldAnticipationThreshold | The threshold above which the machine turn moves from the Hold state to the Post-Hold state, as the user anticipates the turn-taking boundary that is approaching. | 0.5 |

If the function never reaches these thresholds then the Hold state never occurs. The PreHold state transitions directly into the PostHold state. In this circumstance, the boundary between these states can be taken to be the point at which the minimum value of the function occurs. If the minimum occurs at a point with a gradient of zero (i.e. has a fixed minimum value over a certain time period, then the boundary is taken to be the time representing the mid-point of this fixed region.

Time Dependent Priors for Voice Activity Detection

The ResponseLikelihood function could also be used to feed prior predictions of speech onset into a voice activity detector (VAD) algorithm. As a result, the VAD would be continuously changing its parameters as time evolves. Voice activity detectors (VADs) could therefore place a stricter requirement on apparent interruptions which occur at points in time estimated to have low prior onset likelihood, and be less stringent under circumstances where interruptions are anticipated.

Different VADs are parameterized in different ways but they all have parameters that are either thresholds above which speech/noise decisions are made, or more indirect signal to noise ratios threshold parameters. VADs can be altered by changing threshold and ratio parameters. These parameters enable the tuning of the VAD for different speech to noise ratios or for different applications.

This aspect of the invention can utilize a VAD which allows the dynamic modification of such thresholds in real time as the signal is being received. A function maps these threshold parameters such that they decrease (or increase depending on the polarity of the parameter) monotonically as the onset likelihood increases.

The specific function which defines the relationship between the ReponseLikelihood and the VAD energy thresholds would be VAD specific. Those skilled in the art could discover appropriate functions for each VAD through further routine experimentation.

Time Dependent Priors During the Speech Recognition Search

The ResponseLikelihood (see FIG. 7) could also be used during a speech recognition algorithm directly to affect the prior probability of phrases starting given that speech onset was detected at a certain time. Recall that there is a separate Response Likelihood function for each semantic item. This function is time-dependent i.e., the likelihood that the user will start saying a specific semantic item at a specific onset time changes over time. HMM based speech recognizers are driven by a speech grammar graph. The recognizer attempts to align different paths through this grammar against an incoming utterance to find the best matching fit. One way to implement this is to penalize/enhance the transition probabilities at the points in the parsed network which are located at the start of the regions matching semantic item Fn in the grammar. The level of the penalty would depend monotonically on the value of the ResponseLikelihood function. Those skilled in the art could discover appropriate functions for mapping the likelihood to transition probabilities.

By way of example, the W3C speech recognition grammar specification provides for prior probabilities and penalties to be attached to certain paths in the grammar. U.S. Pat. No. 5,999,902 by Scahill, et al. describes one such method for taking such prior likelihoods attached to the nodes of a recognition grammar graph and then back-propagating these probabilities into the grammar graph. Once this is accomplished then a standard recognition parse is performed against the incoming speech signal. If this aspect of the present invention were to be implemented using such a scheme, then a VAD or equivalent device could establish a potential point of speech onset. The Response Likelihood would be computed for all semantic fragments and back-propagated into the recognition grammar graph. Then the utterance would be recognized.

Those skilled in the art will recognize that there are many ways to use prior probabilities to influence that parse of a speech recognizer. This invention is not limited to one specific method for achieving this.

Post-Modification of Acoustic Recognition Results

An alternative to feeding the ResponseLikelihood into the speech recognition graph as prior probabilities is to post-weight the recognition results using the function instead. FIG. 7 shows the process by which this post-weighting would occur. The weighted confidence scores are labeled as the 'Semantic Confidence' on that figure and represent the acoustic confidence from the speech recognizer modified by the Response Likelihood (given the supposed time of speech onset). This approach is also approximated in a different form by the multi-dimensional confidence approach which uses quantized integers to represent different levels of likelihood and combine them.

The use of semantic confidence scores rather than acoustic scores from the recognizer will enable decisions to be made, based on thresholds for example, which will strongly favor results where the onset of speech matches the prior patterns expected given the turn-taking cues and the order and timing of the presentation of items. When used in conjunction with a detailed turn-taking model such as that described herein this should lead to much more stable dialogue systems. Dialogue designs which employ selection from lists or options will benefit especially from this enhancement.

Out-of-Grammar Detection

Speech dialogs have a specific need to detect when a user or noise is outside of its expected recognition grammar graph. This is usually a threshold-based decision which may operate within the recognition engine itself or via an external process. In one embodiment, an out-of-grammar utterance is modeled as a separate special semantic item. The designer can specify the parameters for this model, but they may, for example assign an OOG semantic item to each item in a list to allow 'point and speak' behaviour as described previously. The Response Likelihood function will thus model the likelihood of out-of-grammar utterances having onsets at specific positions in the dialog. If the out-of-grammar status is returned by the recognition process then the Response Likelihood of each out-of-grammar semantic item can be computed and the semantics associated with the highest scoring item selected as the appropriate semantics for the phrase.

An alternative enhancement would be to use the predictions from the Response Likelihood functions of the out-of-grammar utterances to modify the OOG threshold parameters in much the same way as described above for modifying VAD threshold parameters, thus making the recognition process less sensitive to out-of-grammar classifications at times where out-of-grammar utterances are less likely.

Mode Confidence

Users of telephony dialogues may prefer speech or DTMF. In addition, there are reasons for switching from one to the other. In an integrated IVR system, the mode can be modeled as a separate dimension, and certain measurements during the course of the dialogue are used to manage which mode is the preferred mode at a given point in the application.

The mode confidence measure has five confidence states. As per FIG. 8, the five states of mode confidence can be expressed as a continuum represented by the integer values $-2$ through $+2$. The current mode confidence state determines the type of prompting to be used at a given point in the dialog. A different prompt can be allocated to each confidence level, each with different style, wording, and/or intonation. For simpler designs, prompts could be shared between the mode states, for example by defining a single speech prompt to be shared between the two speech states. For example in many designs the states Speech-Mid and Speech-High can share the same prompt, and DTMF-Mid and DTMF-High may also share the same prompt. The states, their corresponding prompting styles, and whether speech or touch-tone detectors are active are shown below Table 8 below:

TABLE 8

| Val | Mode State | Prompt | Speech Active | Speech Barge-In | DTMF Active | DTMF Barge-in |
|---|---|---|---|---|---|---|
| +2 | Speech-High | Speech | Yes | Optional | Yes | Yes |
| +1 | Speech-Low | Speech or Mixed | Yes | Optional | Yes | Yes |
| 0 | Neutral | Mixed | Yes | Optional | Yes | Yes |
| −1 | DTMF-Low | DTMF or Mixed | Yes | No | Yes | Yes |
| −2 | DTMF-High | DTMF | No | No | Yes | Yes |

If the mode confidence is positive, then the system can present prompts in the speech mode. Speech prompts refer to "saying" or "speaking," and ask direct questions. For example a typical speech prompt my be something like:

"Do you want an account balance, money transfer, or another service"

If the mode is negative, then the system can present prompts in the DTMF mode. DTMF prompts refer to "pressing" and usually use the well-known "For . . . " or "To . . . " construct. For example, a typical DTMF prompt may be something like:

"For an account balance, press 1. For money transfer, press 2.

For any other service, press 3."

There are some cases in which a system may want to take advantage of a hybrid prompting or 'Mixed' mode prompting. This is an intermediate mode in which both speech and DTMF are mentioned in the same prompt. There are many different ways to render a mixed mode prompt but one such example is sometimes called a ShadowPrompt™. One approach for presenting a ShadowPrompt is given in U.S. patent application Ser. No. 09/908,377 by Balentine, et al. For example a Shadow prompt may use two different voices as shown below:

"You can say 'account balance' for press 1], 'money transfer' [2] or 'other service [3]."

Where the alternate voice is shown in brackets.

Another way to present 'Mixed' prompting is to ask questions where the verb is omitted or does not indicate which modality is required. For example:

"Please give me your account number"

"and your PIN"

Such prompting is closer to speech mode but is formally a mixed mode prompt.

In general this mixed mode can be presented when the mode is 'Neutral'—i.e., has a value of zero. This mixed mode of prompting could be spread to include the Speech-Mid (+1) or DTMF-Mid states (−1) if desired depending on how much the specific question lends itself to DTMF or to Speech. Disabling speech recognition is an important step in stabilizing the user interface in the presence of noise. For this reason the speech recognizer is disabled in the high-confidence DTMF state. DTMF however is not prone to false triggering. Thus the DTMF detector is always active at least in circumstances where DTMF input would have any meaning in the user interface.

Mode Confidence as a Numeric Parameter

The mode confidence can be modified according to a number of different criteria. A simple way of managing the mode confidence is to increment the mode confidence—i.e., adds 1 to the variable—whenever the caller uses speech successfully.

Similarly if the user attempts to use speech but the mode exhibits problems—conditions which could indicate intermittent noise or other problems—then the system decrements the value (i.e., add −1 to the variable). This means that speech failures can lead to a degradation from speech to DTMF.

Figure 8:
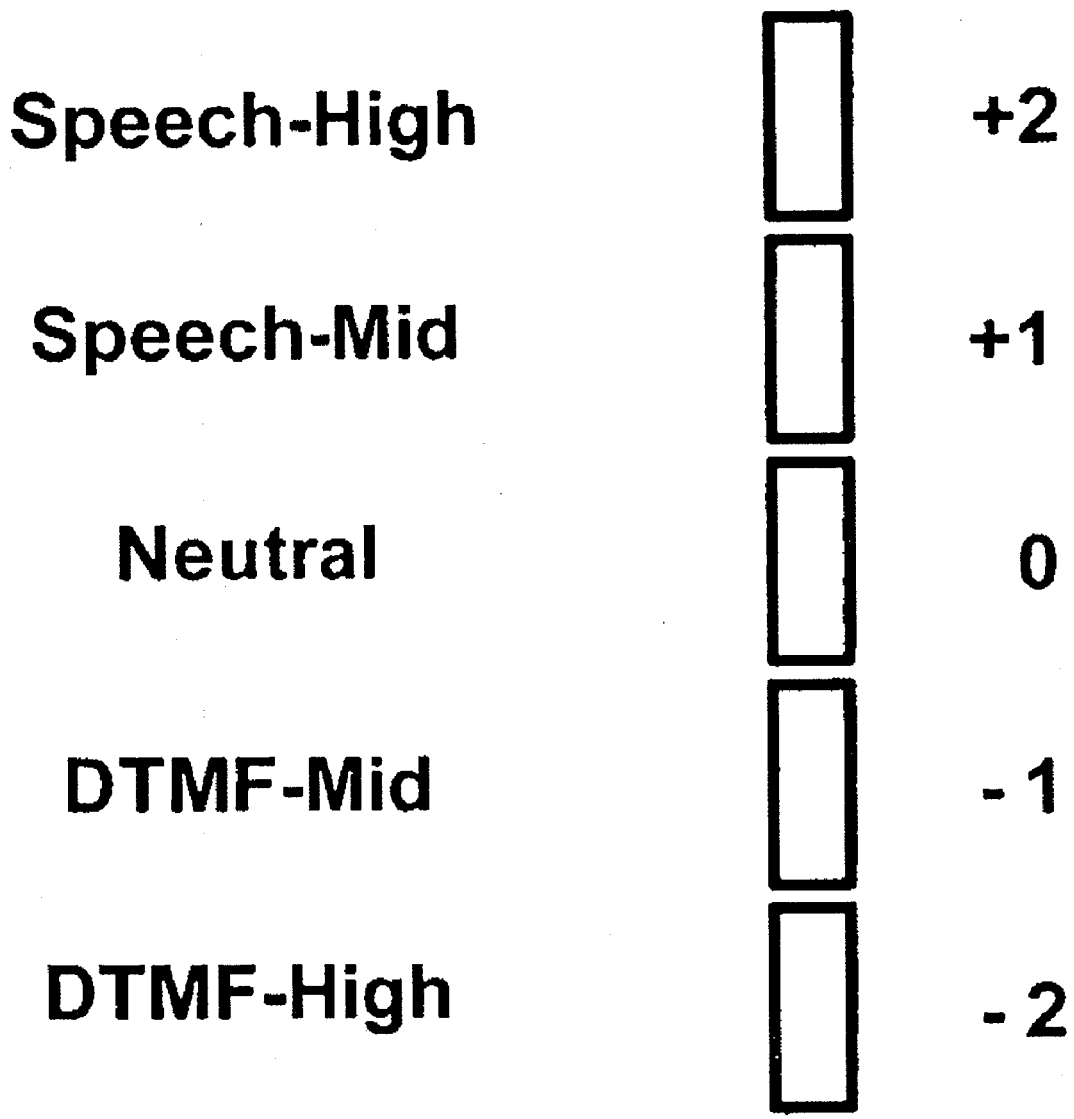
FIG. 8 shows five states of mode confidence values.

The variable can be "capped" at the positive end to a value of +2 as shown in FIG. 8 to prevent values so great that degradation cannot occur rapidly in the event of changes in condition. Although the limit may be anything, the figure shows a limit of two. If the caller uses DTMF successfully, the mode confidence is also decremented by 1. This may lead to a change of mode—from speech to DTMF. The variable can be capped at the negative end to a value of −2 to prevent a permanent commitment to DTMF mode. It is important for the user or for the system to allow transitions from speech and DTMF mode throughout the dialogue session. In most cases, the designer chooses to start a dialogue in the speech mode. There may also be cases in which the start should be DTMF— for example when high noise is detected at the very beginning of the call. This decision may also be sometimes based on the incoming DNIS or ANI.

The multi-dimensional confidence measure described above may act as an input to this mode confidence dimension. For example 'using speech successfully' could be defined to be all cases where the multi-dimensional confidence is above some threshold value—for example +1.

Mode Confidence as a State Machine

Figure 9:
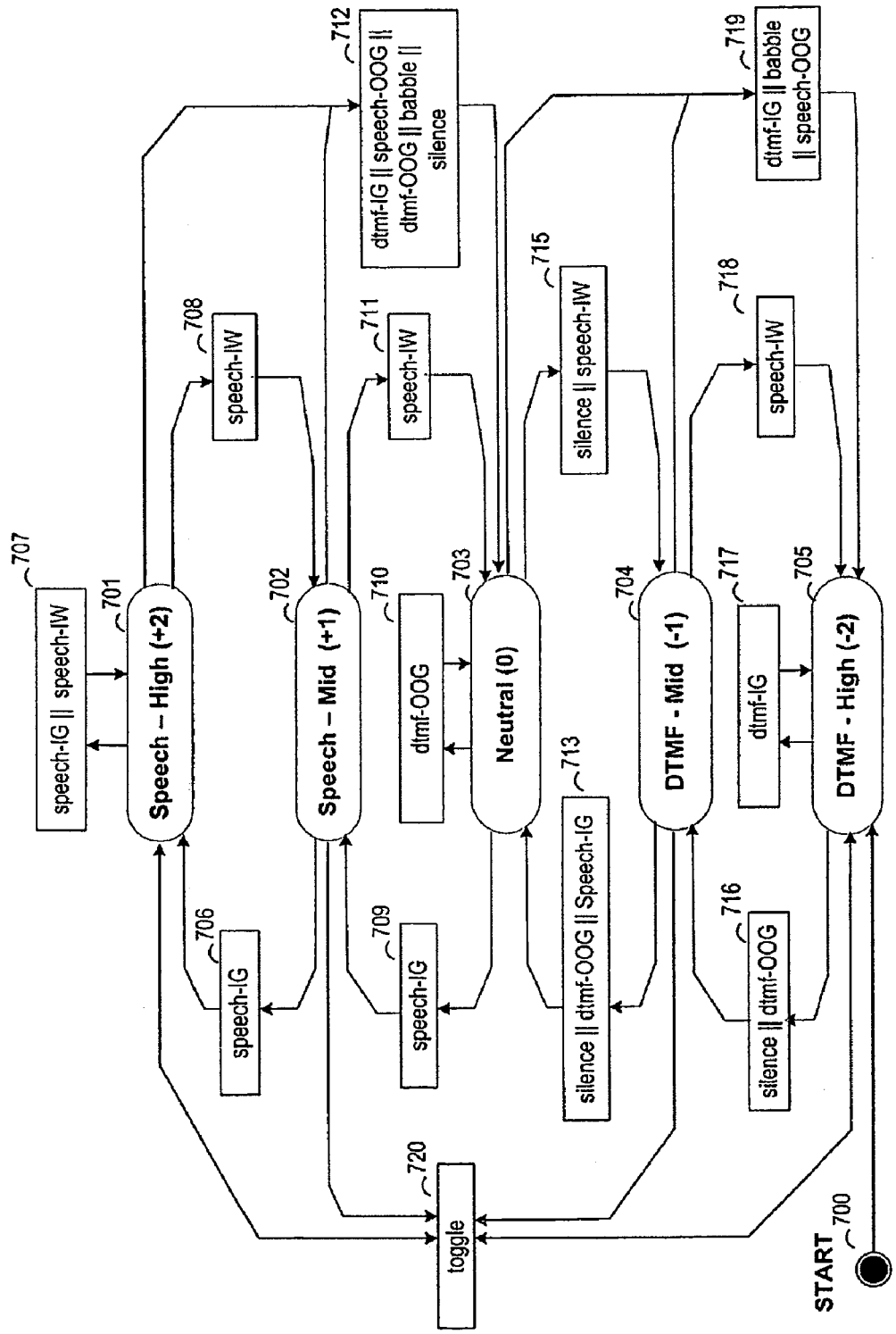
FIG. 9 is a diagram of a state machine modeling a DTMF-Biased mode confidence engine.
Figure 10:
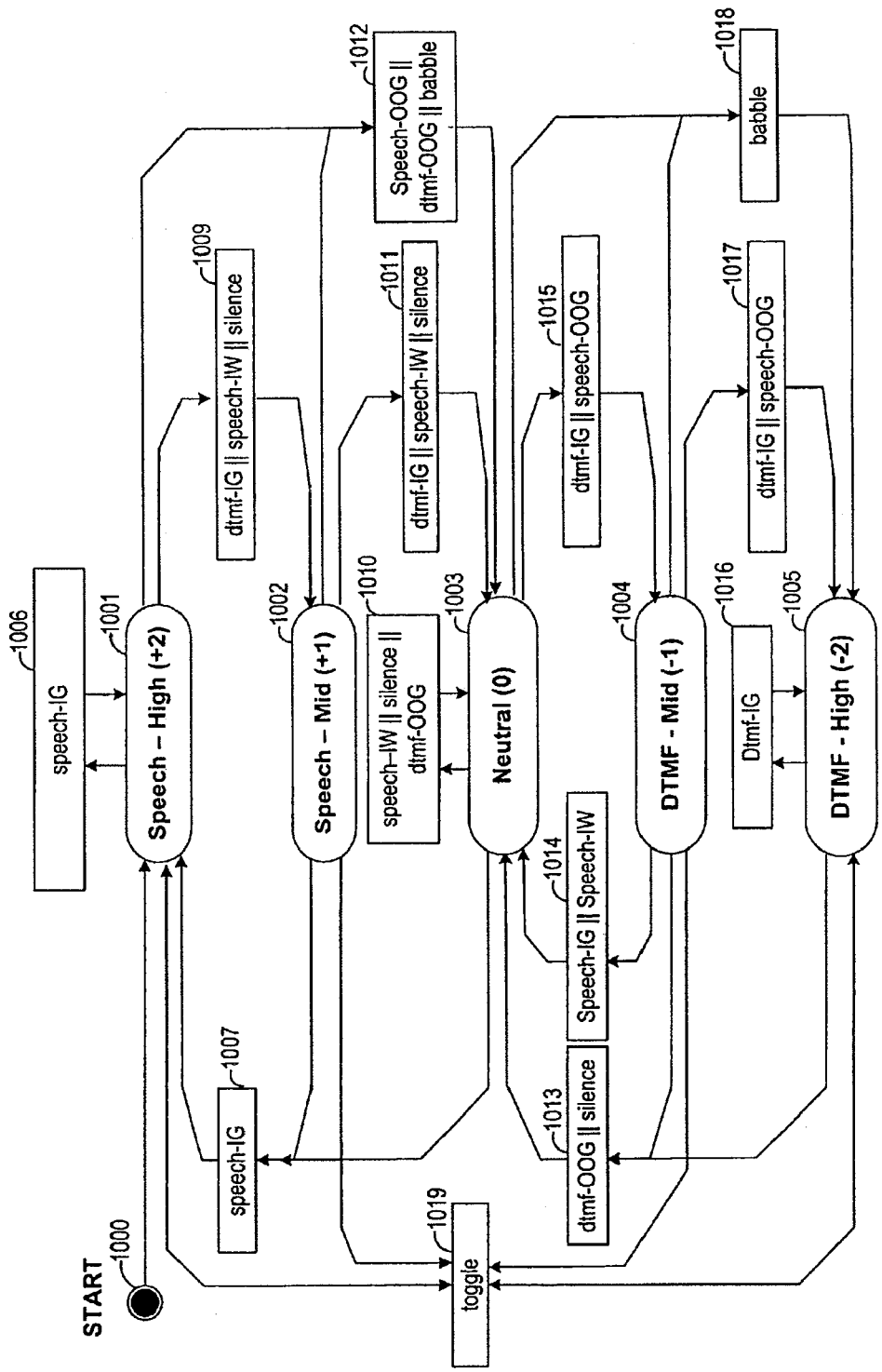
FIG. 10 is a diagram of a state machine modeling a Speech-Biased mode confidence engine.

In an alternative embodiment, the Mode confidence can be explicitly modeled using a state machine. FIG. 10 shows such a state machine modeling a 'Speech-Biased' strategy. FIG. 9 shows a similar state machine, this time modeling a 'DTMF-Biased' strategy. Formally the state machines could also be described as a set of rules incrementing or decrementing a mode confidence value and vice versa as describe above. The states in FIGS. 9 and 10 are shown with their corresponding mode confidence values to illustrate this equivalence. The state machines of FIGS. 9 and 10 have the same five states as described above. Transitions between the states are defined by the outcome of the previous input event. Outcomes of input events are defined as below:

Speech-IG—Confident recognition of an in-grammar utterance.
Speech-IW—An in-grammar utterance which resulted in more than one likely candidate.
Speech-OOG—A low confidence recognition classed as an out-of-grammar utterance.
DTMF-IG—A DTMF response which matched the current DTMF grammar.
DTMF-OOG A DTMF response which did not match the current DTMF grammar.
Babble—Incoming speech or noise exceeded the maximum length allowed.
Silence—No incoming speech was detected within a predetermined time period.
Toggle—The user has explicitly pressed the mode 'Toggle' key (e.g. '#').

The Speech-IW condition represents the case where the recognizer has competing result hypotheses. It usually indicates that the user is likely to be speaking in grammar. The reason for the lower confidence input is often due to problems such as moderate background noise, disfluent stumbles or grammars containing inherently confusable words. Conscious user behavior is not usually the cause. Silence however often results from user confusion. But this confusion can usually be dispelled with a well designed follow-on prompt. Babble is often caused by extended background noise or side conversations between the user and another party. Often the user will be distracted when this condition is returned. DTMF-OOG occurs in conditions where users don't know the appropriate DTMF response at any given point and in a well designed user-interface should be a rare condition.

Toggle is a special case. This allows for the user interface designer to prompt the user with an explicit button to enable the user to switch modalities between DTMF and Speech. The hash key 'ft' is recommended. This is a feature which may be little used, but could be useful for expert users who have a good understanding of the system. A prompt such as 'Switching to Touch-Tone' could be played in response to such a toggle request when in Speech mode. Any number of mode policies could be devised. An example set of policies, including those of FIGS. 9 and 10, are listed below:

Speech-Only—Prompting always encourages speech responses but DTMF input is allowed.
Speech-Biased—Prompting is biased towards speech but difficulties will move towards DTMF.
Explicit—Prompting style may only be explicitly changed by the designer.
DTMF-Biased—Prompting is biased towards DTMF.
DTMF—Only Prompting is DTMF only.

According to the mode policy, the mode confidence behaves differently in the presence of different input events. Mode policies can remain static throughout the duration of a dialog. They could also be different in different areas of the dialog—for example DTMF-biased for numeric input and speech-biased for proper-noun input. The choice or configuration of a mode policy could even be modulated itself by other factors in the dialog—such as the multi-dimensional confidence metric. Where a mode policy does change throughout the dialog the mode confidence is not automatically reset on entry to the new state machine. The mode confidence may also be forced to any value at any time by the designer. When coupled with the explicit mode policy then the mode can be completely under the control of the designer. This can be desirable in specific areas of the dialog where the designer requires a greater degree of control over the mode policy. The designer may also chose to implement her own policy where desired.

The Speech-Only or DTMF-Only policies simply keep the mode state constant at Speech-High or DTMF-High respectively. They are equivalent to the Explicit policy set to these initial values. The Speech-Only policy is not recommended apart for portions of dialog where speech input is really the only viable alternative. These conditions are added for completeness. Recall that the designer may decide to explicitly force a state change and/or change the mode policy at certain points in the dialog. Other policies such as a Neutral policy could be envisaged. However Neutral scripting can be inefficient and it is good practice to only use such scripting as a transitory device at certain parts of the dialog.

By way of example, consider the mode confidence engine of FIG. 10. Recall that this represents a 'Speech-Biased' policy. In the absence of an explicit or inherited start state the state machine can start (1000) in the 'speech-high' state (1002). The state machine is designed to stay in the speech states as much as possible. Whilst in the Speech-High state, continued success in the form of Speech-IG holds the caller in that state (1006). Similarly, success whilst in the Speech-Mid or Neutral state, will also result in immediate promotion to the Speech-High state (1007).

Minor user interface departures such as Silence and Speech-IW cause the state to be degraded from Speech-High to Speech-Med (1009) and subsequently the Neutral state (1011). DTMF-IG also causes gradual 'degradation' towards the neutral state via these transitions. Users who correctly use DTMF while in speech prompting clearly have a motive to use DTMF, but similarly must have an understanding of the appropriate use of DTMF at this point. Thus degradation towards the neutral state is gradual. A good example of this may be experienced users who use DTMF '1' and '2' at speech yes/no questions. This does not necessarily indicate a desire to continue the rest of the dialog in DTMF.

Speech-OOG and Babble both can cause transitions to the neutral state from the Speech-High and Speech-Med states (1012). For the speech-related events the assumption at this point is that there is either noise, or a lack of understanding about what can be said. The user is now empowered by the mixed mode prompting to choose DTMF if desired at this point. Similarly DTMF-OOG can also cause the same transition (1012). The assumption here is that the choice of the DTMF modality indicates the user desire to user DTMF at this point but the OOG status indicates that the user does not know the appropriate key(s). The choice of the Neutral state to deal with the conditions empowers these callers retaining a clear path back to speech in line with the speech-biased policy.

Continued correct use of DTMF can cause the state machine to proceed from the Neutral to the DTMF-Mid (1015) and subsequently DTMF-High states (1017). Users who start in the Speech-High state will have to make two successive correct DTMF entries to hear the dual prompting and a further two correct DTMF entries to fully proceed to the DTMF-High state. This again re-enforces the speech bias while winding to DTMF in the face of a clear user preference for this alternate mode. Once in the DTMF-High state continued correct use of DTMF will keep the caller in this state (1005).

Speech-OOG similarly can cause a step-wise transition from the Neutral to the DTMF-Mid state (1015) and subsequently to the DTMF-High state (1017). Thus continued noise or ill-disciplined engagement from the user in speech causes the user interface to eventually adopt a DTMF only interface where no speech recognition is available. Babble can cause instant degradation from the Neutral to the DTMF-High state (1018). Similarly from the DTMF-Mid to the DTMF-High state (1017). Recall that babble is frequently due to disruptive environmental noise and possible user distraction. DTMF-only interfaces serve such callers in such environments much better than speech interfaces.

Once in the DTMF condition continued correct use of DTMF-High keeps the caller in that state (1016). Given this, what can the user do to return to a speech interface at this point? This is a speech-biased strategy so this is a desirable feature. Silence or DTMF-OOG provide one such route (1013). Recall that silence or DTMF-OOG represent a degree of confusion over how to use the user interface at this point. i.e., the DTMF prompting has apparently not helped. The state machine makes that speech-biased assumption that the user may desire to use speech at this point. Consider the following example:

System(Dtmf-High): "Please key in the first few letters of the city name."
User: (silence)
System (Dtmf-Mid): "Please say or enter the city name?"
User (speech-IG): "Albany"
System (Neutral): "Thank you. Now say or enter the destination city"

Take for example a city name task. DTMF prompting such as 'Please key in the first few letters of the city name' could be the chosen DTMF formulation which evokes a silent response (1013). The follow on prompt 'Please say or enter the city name?' could follow in the Neutral state. If a caller chooses to speak at this point then successful recognition can lead immediately to the Speech-High state (1006) thus effecting a swing to confident speech usage in just two turns Also the ubiquitous 'toggle' key can provide the user with an alternative route to achieve this (1019). Note that pressing the toggle key whilst in the neutral state does not cause a change in state. Given that dual prompting occurs here then this will not be counter intuitive to the user. Diligent implementations however could switch the order of the two mixed modalities in the prompt at this point.

Speech recognition is active in the DTMF-Mid state but it is likely that callers will not be able to distinguish between the DTMF-Mid and DTMF-High states and thus most callers will assume that speech is not active when they hear DTMF prompting. Confident spoken commands, for example from expert users, in this state will return the user to Neutral prompting (1014). This is however an unlikely route. Speech-IW responses also follow this pattern (1019) and will usually be followed by a confirmation or disambiguation question. Confirmation and disambiguation are difficult to script in the neutral mode but it is possible if an implicit speech style is adopted. Consider the following example fragment of dialog:

System(Dtmf-Mid): "Please key in the first few letters of the departure city"
User(speech-IW): "Albany, N.Y."
System (Dtmf-Mid): "Albany, N.Y. <pause> Say yes or press 1'. . .
User (speech-IG): "Yes"
System (Neutral): "Thank you. Now say or enter the destination city"

Another alternative would be to keep Speech-IW responses in the DTMF-Mid state in order to reduce the incidence of dual mode confirmation scripting. FIG. 9 shows a similar policy biased towards DTMF. This policy can have a default start state of DTMF-High (700). Successful use of DTMF in this state can cause the mode confidence to stay in the same state (717). Silence and DTMF-OOG on the other hand does cause a gradual move towards Neutral prompting (716 and 713). This silence path is to accommodate users who are unable to use DTMF (for example rotary phone users). Once callers have become aware of the option to use speech however in the Neutral state then continued silence will return them to the DTMF-Mid state on the assumption that the user is remaining silent for some reason other than the need to use speech (715).

Once in the Neutral state then DTMF-IG immediately transitions to the DTMF-High state. Thus any caller using DTMF appropriately can immediately transition to a DTMF only interface. Babble or OOG at that point also causes an immediate transition to DTMF (719). Recall that speech Barge-In is not enabled in the DTMF-Med state. Thus the interface becomes virtually immune to background noise whilst offering a small number of stable routes back to speech.

Speech-IW however in the Neutral state transitions only to the DTMF-Mid state (715). This gives the user another chance to continue to use speech at this point—in spite of the DTMF style prompting. In most cases however this will result in a transition to DTMF for all but the most determined speech users. A second Speech-IW (718) or a Speech-OOG (719) can result in a transition to the DTMF-High mode. An additional useful feature to enhance the management of mode confidence is to interject brief phrases into the user interface at key transition points. For example when transitioning from the Neutral state to DTMF-High the phrase 'Let's try that using just the keypad' or some similar phrase could be interjected to make it clear to the user that the speech option is not now possible.

Combining Confidence Values

There are a number of ways to let the various dimensions of confidence interact. For simplicity, the following discussion describes a simple summing algorithm.

Normalizing ASR Confidence

Different ASR technologies use different numeric types for confidence. This value must first be normalized to the same numeric type as the time-dimension values. As shown in FIG. 8, a set of five confidence "levels" will suffice to demonstrate the algorithm. After the speech recognizer has returned a result, the confidence is segmented into five levels as shown in the figure. If confidence is "very high"—corresponding to a probability above 95%, for example, or a numeric value close to the maximum allowed—the recognition confidence can be normalized to a value of +2. A high confidence can receive a value of +1, and a medium value can be set to zero. Low confidences can correspond to negative values.

The above method is for descriptive purposes only. Other ways of normalizing the ASR confidence includes table lookup, floating-point numbers, and other representations. The important point is that ASR confidence must be recast into a data type that allows it to interact with the confidence values of other dimensions.

Combining Multi-Dimensional Confidence

Note that there are a number of other dimensions that are relevant to the detection of sentient user behavior, including speech duration and other measurements. Once defined these dimensions can be assimilated with those shown here. Each dimension is first measured with an eye to distinguishing non-human from predicted human behaviors—for example, the duration of speech relative to the expected duration given the grammar. The measurement can then normalized to the data type and range most appropriate for combining it with others. Once this has been accomplished, we simply SUM the confidence for all of the dimensions to derive a single overall confidence. In the example data type, negative numbers detract from the overall value, positive numbers are additive. A value of zero does not influence the other dimensions.

The basic principle is as shown below with turn-taking. As shown in the truth table in Table 10 below, combining the ASR confidence, which can be thought of as the "vertical" component of the input, with the turn-taking confidence, which can be thought of as a "horizontal" component, results in constructive (reinforcing) or destructive (canceling) interactions between the two dimensions. As shown in table 10, the user that interrupts at the "wrong" time (low turn-taking confidence) must experience very high recognition confidence before the system will accept the input as sentient user behavior. Conversely, recognition confidence can be marginal provided the user takes his turn at appropriate times.

TABLE 10

Combining Multi-Dimensional Confidence

| | | Turn Taking Confidence | | |
|---|---|---|---|---|
| | | Low (−1) | Medium (0) | High (+1) |
| ASR Confidence | Very High (+2) | +1 | +2 | +3 |
| | High (+1) | 0 | +1 | +2 |
| | Medium (0) | −1 | 0 | +1 |
| | Low (−1) | −2 | −1 | 0 |
| | Very Low (−2) | −3 | −2 | −1 |

As can be seen in Table 10, the total confidence is more reliable than either in isolation. The combination of multi-dimensional confidence allows measures that carry uncertainty, including statistical measures typical of ASR dialogues—to interact in such a way as to increase certainty, thereby reducing complexity of error recovery. Note that summing positive and negative integers is only one of several methods for allowing confidence values to interact. Summation methods lend themselves well to probabilistic-like confidence measures which are expressed as logarithms, such as speech recognition confidence often is.

Many of the aspects of this invention apply to the temporal dimension of any user interface. Especially those which progress through states where the permitted user input changes state by state. Such systems may be though of more broadly as 'dialog systems'. One such similarity regards the timing of user responses at the boundary of state changes. For example, current list browsing devices which uses Touch-Tone (DTMF) as their input modality frequently have problems at the boundaries between items in the list. Consider a user interface which in the absence of any input presents a list of financial transactions. The user interface further invites the user to 'press 1 to repeat an item or press '2' to select it. Problems occur in such systems just after the boundary between items in the list because key presses to select or repeat an item refer to the previous item not the one that has just begun to be presented. Adopting the practice of overlapping an active grammar for DTMF at a prompt boundary would mitigate this problem. Other user interfaces with temporally evolving media and deictic interfaces (keyboards, pointing devices etc) may also exhibit similar requirements.

Similarly, failure to provide feedback to inputs in a sufficient time period, especially with regard to cutting temporally evolving media such as audio or video can cause spontaneous restarts of the user input in a manner directly analogous to speech restarts in man-machine dialog. This would extend to, but not be limited by, systems with keyboard input, speech input, stylus input or other gestural user input methods. Those skilled in the art will recognize that this invention can be applied in such instances to mitigate these problems.

This disclosure describes many embodiments. In a first embodiment, a method for managing interactive dialog between a machine and a user comprising: verbalizing at least one desired sequence of one or more spoken phrases; enabling a user to hear the at least one desired sequence of one or more spoken phrases; receiving audio input from the user or an environment of the user; determining a timing position of a possible speech onset from the audio input; managing an interaction between the at least one desired sequence of one or more spoken phrases and the audio input, by determining at least one likelihood value dependent upon the possible speech onset. The first embodiment, wherein the at least one likelihood value is dependent upon at least one of: a model of a desire of the user for specific items; a model of an attention of the user to specific items; or a model of turn-taking cues. 12. The first embodiment, further comprising continuously utilizing the at least one likelihood value for a voice activity system.

The first embodiment, further comprising determining at least one recognition result from the audio input, wherein the at least one recognition result is dependent upon the timing position of the possible speech onset. The first embodiment, further comprising modifying an operation which generates at least one recognition result, wherein the at least one recognition result is dependent upon the timing of the possible speech onset. The first embodiment, further comprising determining at least one confidence value from the audio input, wherein the at least one confidence value is dependent upon the at least one likelihood value and a recognition result from the audio input. The first embodiment, wherein the step of determining the at least one likelihood value further comprises utilizing a substantive meaning and a timing position of at least one phrase of the at least one desired sequence of one or more phrases. The first embodiment, wherein the at least one confidence is further dependent upon a timing position within the at least one phrase within the at least one desired sequence of one or more phrases.

The first embodiment, wherein the at least one desired sequence of one or more spoken phrases comprises a plurality of desired sequences of one or more spoken phrases, and at least one confidence value is affected by a transition from one desired sequence of one or more spoken phrases to another desired sequence of one or more spoken phrases. The first embodiment, wherein the at least one confidence value is continuously affected by subsequent transitions from one desired sequence of one or more spoken phrases to another desired sequence of one or more spoken phrases. The first embodiment, wherein each desired sequence of one or more spoken phrases comprises a plurality of time zones and the confidence value is further affected by a timing position of the possible speech onset within at least one time zone. The first embodiment, further comprising determining the confidence value in response to a substantive meaning and a timing position of at least one phrase of the at least one desired sequence of one or more phrases.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for managing interactive voice response dialog between a machine comprising automatic speech recognition and a user, said method comprising the steps of:
setting a mode confidence level parameter value to a first value prior to a first input from said user wherein said first input is of a speech input mode;
selecting one of a plurality of audio prompts comprising speech to annunciate to the user from the machine based on said first value of said mode confidence level parameter, wherein said one of said plurality of audio prompts solicits said first input comprising a first semantic response from said user in said speech input mode;
annunciating the at least one of a plurality of audio prompts to said user;
receiving said first input from said user;
determining a first speech recognition confidence level based on said first input;
setting said mode confidence level parameter to a second value based on said first speech recognition confidence level, said second value indicating a lower level of confidence of recognition relative to said first value of said mode confidence level;
selecting an another one of at least one of a plurality of audio prompts based on said mode confidence level; and
annunciating to the user from the machine said another one of least one of a plurality of audio prompts comprising speech based on said second value of said mode confidence level wherein said another one of said plurality of phrases solicits said first semantic response from said user in a DTMF input mode.

2. The method of claim 1 where said another one of at said plurality of audio prompts directs the user to press a telephone keypad in response to said another one of said plurality of audio prompts.

3. The method of claim 2 wherein the step of selecting the another one of said plurality audio prompts comprises the steps of:
a. determining a value of a speech duration confidence parameter based on the onset and offset of said first input user speech, and
b. using the value of the speech duration confidence parameter and said second value of the mode confidence level to select the another one of said plurality of audio prompts.

4. The method of claim 2 wherein said one of a plurality of audio prompts comprises a plurality of segments, and the step of selecting the another one of said plurality of audio prompts comprises the steps of:
detecting an onset of said first input user speech relative to a segment of said audio prompt;
determining a value of a turn-taking confidence level parameter based on detection of said onset; and
using the value of the turn-taking confidence level parameter and said second value of said mode confidence level parameter to select the another one of said plurality of audio prompts.

5. The method of claim 4 where said turn-taking confidence level is based in part on a time period between the beginning of said onset and an end of said segment.

6. The method of claim 4 wherein said first input is recognized as an out-of-grammar utterance.

7. The method of claim 1 further comprising the steps of:
receiving a second input from said user in response to said another one of said plurality of audio prompts;
setting said mode confidence level parameter to a third level based on said second input; and
annunciating a third audio prompt to the user from the machine based on said third level of said mode confidence level parameter wherein said third audio prompt solicits input from said user in said DTMF input mode.

8. The method of claim 1 wherein a speech recognition capability of said machine is disabled after determining said first speech recognition confidence level based on said first input.

9. A method for managing interactive voice response dialog between a machine comprising automatic speech recognition and a user, said method comprising the steps of:
setting a mode confidence level parameter at a first value prior to a first input from said user wherein said first input is of a DTMF input mode;
selecting one of a plurality of audio prompts comprising speech to annunciate to the user from the machine based on said first value of said mode confidence level parameter, wherein said one of said plurality of audio prompts solicits said first input comprising a first semantic response from said user in said DTMF input mode;
annunciating the at least one of a plurality of audio prompts to said user;
receiving said first input from said user;
determining a first speech recognition confidence level based on said first input;
setting said mode confidence level parameter to a second value based on said first speech recognition confidence level, said second value indicating a higher level of confidence of recognition relative to said mode confidence level;
selecting an another one of at least one of a plurality of audio prompts based on said mode confidence level; and
annunciating to the user from the machine said another one of at least one of a plurality of audio prompts comprising speech based on said second value of said mode confidence level wherein said another one of said plurality of audio prompts solicits a different semantic response from said user in a speech input mode.

10. The method of claim 9 wherein said first input is recognized as an in-grammar.

11. A method for managing interactive voice response dialog between a machine comprising automatic speech recognition and a user, said method comprising the steps of:
setting a mode confidence level parameter at a first value prior to a first input from said user wherein said first input is of a speech input mode;
selecting one of a plurality of audio prompts comprising a plurality of speech segments to annunciate to the user from the machine, wherein said one of said plurality of audio prompts solicits said first input comprising a first semantic response from said user in said speech input mode;
annunciating the at least one of the plurality of speech segments to said user;
receiving said first input from said user, wherein said first input comprises speech input mode;
determining a first speech recognition confidence value based on said first input;

determining an onset time of said speech relative to the at least one of the plurality of speech segment for determining a turn confidence value;

determining a speech duration of said first input, said speech duration used for determining a speech duration confidence value;

using said first speech recognition confidence value, said turn confidence value, said speech duration confidence value for setting said mode confidence level parameter at a second value;

selecting another one of at least another one of a plurality of audio prompts based on said mode confidence level parameter; and annunciating to the user from the machine another one of said plurality of audio prompts wherein said another one of said plurality of audio prompts solicits said first semantic response from said user in a DTMF input mode.

12. The method of claim 11 wherein said speech duration of said first input is based on the duration between speech onset and speech offset of said first input, and said speech duration is longer than a specified range for an expected response.

* * * * *